United States Patent
Gao et al.

(10) Patent No.: US 10,980,013 B2
(45) Date of Patent: Apr. 13, 2021

(54) DATA TRANSMISSION METHOD AND DEVICE

(71) Applicant: China Academy of Telecommunications Technology, Beijing (CN)

(72) Inventors: Xuejuan Gao, Beijing (CN); Xueming Pan, Beijing (CN); Fang-Chen Cheng, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 104 days.

(21) Appl. No.: 16/336,092

(22) PCT Filed: Aug. 22, 2017

(86) PCT No.: PCT/CN2017/098522
§ 371 (c)(1),
(2) Date: Mar. 22, 2019

(87) PCT Pub. No.: WO2018/054192
PCT Pub. Date: Mar. 29, 2018

(65) Prior Publication Data
US 2020/0187169 A1 Jun. 11, 2020

(30) Foreign Application Priority Data

Sep. 23, 2016 (CN) .......................... 201610849716.8

(51) Int. Cl.
*H04W 72/04* (2009.01)
*H04L 5/00* (2006.01)
*H04L 5/14* (2006.01)

(52) U.S. Cl.
CPC ......... *H04W 72/042* (2013.01); *H04L 5/0055* (2013.01); *H04L 5/14* (2013.01); *H04W 72/0446* (2013.01)

(58) Field of Classification Search
CPC ............ H04W 72/042; H04W 72/0446; H04L 5/0055; H04L 5/14; H04L 5/1469; H04L 5/0044; H04L 5/0094
See application file for complete search history.

(56) References Cited

U.S. PATENT DOCUMENTS

2018/0359122 A1* 12/2018 Lee .................. H04L 5/0044
2019/0165891 A1* 5/2019 Iwai ................. H04W 72/0413

FOREIGN PATENT DOCUMENTS

| CN | 101998539 A | 3/2011 |
|---|---|---|
| CN | 102958058 A | 3/2013 |

(Continued)

OTHER PUBLICATIONS

Toni A. Levanen et al, "Radio Interface Evolution Towards 5G and Enhanced Local Area Communications",IEEE Access vol. 2,2014, Sep. 19, 2014,pp. 1005-1029 Dept. of Electronics and Communications Engineering, Tampere University of Technology. Tampere 33720, Finland.

(Continued)

Primary Examiner — Kiet Tang
(74) Attorney, Agent, or Firm — Foley & Lardner LLP

(57) ABSTRACT

Disclosed in the present application are a data transmission method and a device, comprising: dividing a time unit into DL areas, a time unit including at least two DL areas; notifying a terminal of the divided DL areas by means of configuration signaling. The terminal receiving the configuration signaling; according to said configuration signaling, determining DL areas into which a time unit is divided. Using the present application, defining at least two DL detection areas in a time unit, a terminal detects a downlink (Continued)

transmission in each detection area, and, when one is detected, performs ACK/NACK feedback in an uplink area corresponding to said downlink area. In the present invention, each downlink area has a defined feedback and scheduling relationship, respectively, by means of dividing a time unit into multiple downlink areas, thereby increasing scheduling flexibility and system resource utilization.

22 Claims, 12 Drawing Sheets

(56) References Cited

FOREIGN PATENT DOCUMENTS

| | | |
|---|---|---|
| CN | 103312462 A | 9/2013 |
| CN | 103370970 A | 10/2013 |
| CN | 104010368 A | 8/2014 |
| CN | 104811286 A | 7/2015 |
| CN | 105308892 A | 2/2016 |
| JP | 2016-508688 A | 3/2016 |
| WO | WO-2016/196036 A1 | 12/2016 |

OTHER PUBLICATIONS

Ericsson, "On dynamic TDD," TSG-RAN WG1 Meeting #86, R1-167044, Gothenburg, Sweden, Aug. 22-26, 2016.

Fujitsu, "Discussion on flexible/dynamic TDD," 3GPP TSG RAN WG1 Meeting #86, R1-166674, Gothenburg, Sweden, Aug. 22-26, 2016.

Qualcomm Incorporated, "Signaling mechanisms for TDD UL-DL reconfiguration," 3GPP TSG-RAN WG1 Meeting #74, R1-133581, Barcelona, Spain, Aug. 19-23, 2013.

Toni A. Levanen, et al. "Radio Interface Evolution Towards 5G and Enhanced Local Area Communications", Jun. 27, 2014; 25 pages; vol. 2, 2014; IEEE Access; Tampere 33720, Finland.

3GPP: "Overview of frame structure for NR"; Discussion and decision; 3GPP TSG RAN WG1 Meeting #86; Aug. 22-26, 2016; pp. 1-8; 8.1.3.2 R1-166102; Huawei, HiSilicon; Gothenburg, Sweden.

NTT Docomo, Inc., "Discussion about TDD Frame Structure for Latency Reduction," 3GPP TSG RAN WG1 Meeting #84bis, R1-163174, Busan, Korea, Apr. 11-15, 2016.

International Search Report and Written Opinion for International Appl. No. PCT/CN2017/098522, dated Nov. 16, 2017.

* cited by examiner

DATA TRANSMISSION METHOD AND DEVICE

This application is a National Stage of International Application No. PCT/CN2017/098522, filed Aug. 22, 2017, which claims priority to Chinese Patent Application No. 201610849716.8, filed Sep. 23, 2016, both of which are hereby incorporated by reference in their entireties.

FIELD

The present invention relates to the field of wireless communications, and particularly to a method and apparatus for transmitting data.

BACKGROUND

The following frame structure is defined for the Time Division Duplex (TDD) mode in the existing Long Term Evolution (LTE) system.

FIG. 1 illustrates a schematic diagram of the frame structure type 2 for an LTE TDD system, and as illustrated, there are different sub-frames or slots at the same frequency for uplink and downlink transmission in the Frame Structure type 2 (FS2) in the LTE TDD system. Each 10 ms radio frame includes two 5 ms half-frames, and each half-frame includes five sub-frames with a length of 1 ms. The sub-frames in the FS2 are categorized into downlink sub-frames, uplink sub-frames and special sub-frames, where each special sub-frame includes a Downlink Pilot Time Slot (DwPTS), a Guard Period (GP), and an Uplink Pilot Time Slot (UpPTS). Each half-frame includes at least one downlink sub-frame, at least one uplink sub-frame, and at most one special sub-frame. Seven TDD uplink-downlink configurations as depicted in Table 1, and ten special sub-frame structures as depicted in Table 2 are defined for different downlink to uplink switching periodicities and uplink-downlink allocation proportions.

TABLE 1

Uplink-downlink configurations.

| Uplink-downlink configuration | Downlink-to-Uplink Switching periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

TABLE 2

Special sub-frame configurations (including DwPTS/GP/UpPTS lengths).

| Special sub-frame configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Where Ts is an interval of time in the system, and X is a predefined or preconfigured value.

In the LTE system, uplink and downlink resources are allocated by defining the TDD frame structure above, therefore, for an LTE cell, only one TDD frame structure can be configured and only a fixed allocation of the uplink and downlink resources is supported, where the allocation is notified via system information broadcasted in the cell, so it is fixed and shared among all the UEs in the cell.

Furthermore, in the LTE system, a GP shall be arranged between an uplink resource and a downlink resource to thereby avoid interference between the uplink and the downlink in the same cell, and to switch from the downlink to the uplink. A GP only exists in a special sub-frame in each TDD uplink-downlink configuration, and a length of the GP is determined by a special sub-frame configuration corresponding to an allocation of lengths of a downlink resource (a DwPTS component), an uplink resource (an UpPTS component), and a GP component in the special sub-frame. The special sub-frame configuration is also notified in a cell via system information broadcasted in the cell, so it is fixed and shared among all the UEs in the cell.

A drawback in the prior art lies in that there has been absent so far a solution to transmit data over dynamically allocated uplink and downlink resources, for example, in the existing 5G system.

SUMMARY

Embodiments of the invention provide a method and apparatus for transmitting data so as to provide a solution capable of dynamically allocating uplink and downlink resources for data transmission.

An embodiment of the invention provides a method for transmitting data, the method including: allocating DL regions in a time unit, wherein the time unit includes at least two DL regions; and notifying a UE of the allocated DL regions via configuration signaling.

Optionally, the notifying the UE of the allocated DL regions via the configuration signaling includes: notifying the UE of lengths and positions of the DL regions in the time unit; or notifying the UE of one of a plurality of predefined patterns, wherein each pattern includes an allocation of lengths and positions of the DL regions in the time unit; or notifying the UE of start or end positions of the DL regions in the time unit.

Optionally, a UL region and/or a GP region in the time unit is further notified via the configuration signaling via one of following operations: notifying the UE of a length and a position of the UL region in the time unit; or notifying the UE of one of a plurality of predefined patterns, wherein each pattern includes an allocation of a length and a position of the UL region in the time unit; or notifying the UE of a start or end position of the UL region in the time unit; or notifying the UE of indication information so that the UE determines the UL region in the time unit according to the indication information under a predefined rule.

Optionally, the method further includes: determining the UL region in the time unit according to uplink scheduling signaling, or according to a position at which ACK/NACK for downlink transmission is fed back.

Optionally, the configuration signaling is transmitted via higher-layer signaling or physical downlink control signaling in a unicast or broadcast or multicast form.

Optionally, the method further includes: transmitting a downlink control channel to the UE in at least one DL region in the time unit.

Optionally, before the downlink control channel is transmitted to the UE in at least one DL region in the time unit, the method further includes: determining a detection DL region of the UE in the time unit, and notifying the UE of the detection DL region via configuration information, or determining a detection DL region in the time unit according to a pre-definition, wherein the detection DL region is a part or all of the DL regions in the time unit; and when the detection DL region is configured or predefined, transmitting the downlink control channel to the UE in at least one DL region in the detection DL region corresponding to the UE.

Optionally, the method further includes: when a downlink DCI format is used for the downlink control channel, receiving ACK/NACK feedback for the downlink control channel, and/or ACK/NACK feedback for a downlink shared channel corresponding to the downlink control channel, in a UL region corresponding to a DL region in which the downlink control channel is transmitted; or when an uplink DCI format is used for the downlink control channel, receiving an uplink shared channel corresponding to the downlink control channel in a UL region corresponding to a DL region in which the downlink control channel is transmitted.

Optionally, a UL region corresponding to a DL region is determined in one or a combination of the following schemes: a region spaced from the DL region by a length T after an end position of the DL region is the UL region corresponding to the DL region, or the first UL region spaced from the DL region by a length T after an end position of the DL region is a UL feedback region corresponding to the DL region, wherein T is predefined or configured; or the UL region corresponding to the DL region is indicated in indication information in the downlink control channel; or a UL region corresponding to a part of DL regions in a time unit is predefined or configured as a UL region in the current time unit, and if there are a plurality of UL regions in the current time unit, then the UL region corresponding to the part of the DL regions is one or more predefined or configured UL regions in the current time unit; or a UL region corresponding to a part of DL regions in a time unit is predefined or configured as a UL region in the next time unit, and if there are a plurality of UL regions in the next time unit, then the UL region corresponding to the part of the DL regions is one or more predefined or configured UL regions in the next time unit; or a UL region corresponding to a DL region in a time unit is predefined or configured as a UL region in the current time unit, and if there are a plurality of DL regions and a plurality of UL regions in the current time unit, then each DL region corresponds to one or more predefined or configured UL regions.

Optionally, the time unit is one or more slots, or one or more sub-frames.

An embodiment of the invention provides a method for transmitting data, the method including: receiving configuration signaling; and determining DL regions allocated in a time unit according to the configuration signaling, wherein the time unit includes at least two DL regions.

Optionally, determining the DL regions allocated in the time unit according to the configuration signaling includes: determining lengths and positions of the DL regions in the time unit according to a notification of the configuration signaling; or determining one of a plurality of predefined patterns according to a notification of the configuration signaling, wherein each pattern includes an allocation of lengths and positions of the DL regions in the time unit; or determining start or end positions of the DL regions in the time unit according to a notification of the configuration signaling.

Optionally, determining the DL regions allocated in the time unit according to the configuration signaling further includes determining a UL region and/or a GP region in the time unit according to the configuration signaling, wherein a length and a position of the UL region in the time unit is notified via the configuration signaling; or one of a predefined patterns is notified via the configuration signaling, wherein each pattern includes an allocation of a length and a position of the UL region in the time unit; or a start or end position of the UL region in the time unit is notified via the configuration signaling; or indication information is notified via the configuration signaling so that the UE determines the UL region in the time unit according to the indication information under a predefined rule.

Optionally, the method further includes: determining, by the UE, the UL region in the time unit according to uplink scheduling signaling, or determining, by the UE, the UL region in the time unit according to a position at which ACK/NACK for downlink transmission is fed back.

Optionally, the configuration signaling is transmitted via higher-layer signaling or physical downlink control signaling in a unicast or broadcast or multicast form.

Optionally, the method further includes: detecting, by the UE, each DL region or each detection DL region in the time unit for a downlink control channel.

Optionally, before each detection DL region in the time unit is detected for the downlink control channel, the method further includes: receiving configuration information, and determining a detection DL region in the time unit according to the configuration information, or determining a detection DL region in the time unit according to a pre-definition, wherein the detection DL region is a part or all of the DL regions in the time unit.

Optionally, the method further includes: when a downlink DCI format is used for the downlink control channel, transmitting ACK/NACK feedback for the downlink control channel, and/or ACK/NACK feedback for a downlink shared channel corresponding to the downlink control channel, in a UL region corresponding to a DL region in which the downlink control channel is received; or when an uplink DCI format is used for the downlink control channel, transmitting an uplink shared channel corresponding to the downlink control channel in a UL region corresponding to a DL region in which the downlink control channel is received.

Optionally, a UL region corresponding to a DL region is determined in one or a combination of the following schemes: a region spaced from the DL region by a length T after an end position of the DL region is the UL region corresponding to the DL region, or the first UL region spaced from the DL region by a length T after an end position of the DL region is a UL feedback region corresponding to the DL region, wherein T is predefined or configured; or the UL region corresponding to the DL region is indicated in indication information in the downlink control channel; or a UL region corresponding to a part of DL regions in a time unit is predefined or configured as a UL region in the current time unit, and if there are a plurality of UL regions in the current time unit, then the UL region corresponding to the part of the DL regions is one or more predefined or configured UL regions in the current time unit; or a UL region corresponding to a part of DL regions in a time unit is predefined or configured as a UL region in the next time unit, and if there are a plurality of UL regions in the next time unit, then the UL region corresponding to the part of the DL regions is one or more predefined or configured UL regions in the next time unit; or a UL region corresponding to a DL region in a time unit is predefined or configured as a UL region in the current time unit, and if there are a plurality of DL regions and a plurality of UL regions in the current time unit, then each DL region corresponds to one or more predefined or configured UL regions.

Optionally, the time unit is one or more slots, or one or more sub-frames.

An embodiment of the invention provides an apparatus for transmitting data, the apparatus including: an allocating module configured to allocate DL regions in a time unit, wherein the time unit includes at least two DL regions; and a notifying module configured to notify a UE of the allocated DL regions via configuration signaling.

Optionally, the notifying module is configured to notify the UE of the allocated DL regions via the configuration signaling by: notifying the UE of lengths and positions of the DL regions in the time unit; or notifying the UE of one of a plurality of predefined patterns, wherein each pattern includes an allocation of lengths and positions of the DL regions in the time unit; or notifying the UE of start or end positions of the DL regions in the time unit.

Optionally, the notifying module is further configured to notify the UE of a UL region and/or a GP region in the time unit via the configuration signaling by: notifying the UE of a length and a position of the UL region in the time unit; or notifying the UE of one of a predefined patterns, wherein each pattern includes an allocation of a length and a position of the UL region in the time unit; or notifying the UE of a start or end position of the UL region in the time unit; or notifying the UE of indication information so that the UE determines the UL region in the time unit according to the indication information under a predefined rule.

Optionally, in the apparatus, the UL region in the time unit is determined according to uplink scheduling signaling, or determined according to a position at which ACK/NACK for downlink transmission is fed back.

Optionally, the notifying module is further configured to transmit the configuration signaling via higher-layer signaling or physical downlink control signaling in a unicast or broadcast or multicast form.

Optionally, the apparatus further includes a transmitting module configured to transmit a downlink control channel to the UE in at least one DL region in the time unit.

Optionally, before the downlink control channel is transmitted to the UE in at least one DL region in the time unit, the transmitting module is further configured to: determine a detection DL region of the UE in the time unit, and notify the UE of the detection DL region via configuration information, or determine a detection DL region in the time unit according to a pre-definition, wherein the detection DL region is a part or all of the DL regions in the time unit; and transmit the downlink control channel to the UE in at least one DL region in the detection DL region corresponding to the UE, when the detection DL region is configured or predefined.

Optionally, the transmitting module is further configured to: receive ACK/NACK feedback for the downlink control channel, and/or ACK/NACK feedback for a downlink shared channel corresponding to the downlink control channel, in a UL region corresponding to a DL region in which the downlink control channel is transmitted, when a downlink DCI format is used for the downlink control channel; or receive an uplink shared channel corresponding to the downlink control channel in a UL region corresponding to a DL region in which the downlink control channel is transmitted, when an uplink DCI format is used for the downlink control channel.

Optionally, a UL region corresponding to a DL region is determined in one or a combination of the following schemes: a region spaced from the DL region by a length T after an end position of the DL region is the UL region corresponding to the DL region, or the first UL region spaced from the DL region by a length T after an end position of the DL region is a UL feedback region corresponding to the DL region, wherein T is predefined or configured; or the UL region corresponding to the DL region is indicated in indication information in the downlink control channel; or a UL region corresponding to a part of DL regions in a time unit is predefined or configured as a UL region in the current time unit, and if there are a plurality of UL regions in the current time unit, then the UL region corresponding to the part of the DL regions is one or more predefined or configured UL regions in the current time unit; or a UL region corresponding to a part of DL regions in a time unit is predefined or configured as a UL region in the next time unit, and if there are a plurality of UL regions in the next time unit, then the UL region corresponding to the part of the DL regions is one or more predefined or configured UL regions in the next time unit; or a UL region corresponding to a DL region in a time unit is predefined or configured as a UL region in the current time unit, and if there are a plurality of DL regions and a plurality of UL regions in the current time unit, then each DL region corresponds to one or more predefined or configured UL regions.

Optionally, the time unit is one or more slots, or one or more sub-frames.

An embodiment of the invention provides an apparatus for transmitting data, the apparatus including: a receiving module configured to receive configuration signaling; and a determining module configured to determine DL regions allocated in a time unit according to the configuration signaling, wherein the time unit includes at least two DL regions.

Optionally, the determining module is configured to determine the DL regions allocated in the time unit according to the configuration signaling by: determining lengths and positions of the DL regions in the time unit according to the configuration signaling; or determining one of a plurality of predefined patterns according to the configuration signaling, wherein each pattern includes an allocation of lengths and positions of the DL regions in the time unit; or determining start or end positions of the DL regions in the time unit according to the configuration signaling.

Optionally, the determining module is further configured to: determine a UL region and/or a GP region in the time unit according to the configuration signaling, wherein: a length and a position of the UL region in the time unit is notified via the configuration signaling; or one of a predefined patterns is notified via the configuration signaling, wherein each pattern includes an allocation of a length and a position of the UL region in the time unit; or a start or end position of the UL region in the time unit is notified via the configuration signaling; or indication information is notified via the configuration signaling so that the UE determines the UL region in the time unit according to the indication information under a predefined rule.

Optionally, the determining module is further configured to: determine the UL region in the time unit according to uplink scheduling signaling, or determine the UL region in the time unit according to a position at which ACK/NACK for downlink transmission is fed back.

Optionally, the receiving module is further configured to receive the configuration signaling transmitted via higher-layer signaling or physical downlink control signaling in a unicast or broadcast or multicast form.

Optionally, the apparatus further includes: a detecting module configured to detect each DL region or each detection DL region in the time unit for a downlink control channel.

Optionally, before each detection DL region in the time unit is detected for the downlink control channel, the detecting module is further configured to: receive configuration information, and determine a detection DL region in the time unit according to the configuration information, or determine a detection DL region in the time unit according to a pre-definition, wherein the detection DL region is a part or all of the DL regions in the time unit.

Optionally, the detecting module is further configured to: transmit ACK/NACK feedback for the downlink control channel, and/or ACK/NACK feedback for a downlink shared channel corresponding to the downlink control channel, in a UL region corresponding to a DL region in which the downlink control channel is received, when a downlink DCI format is used for the downlink control channel; or transmit an uplink shared channel corresponding to the downlink control channel in a UL region corresponding to a DL region in which the downlink control channel is received, when an uplink DCI format is used for the downlink control channel.

Optionally, a UL region corresponding to a DL region is determined in one or a combination of the following schemes: a region spaced from the DL region by a length T after an end position of the DL region is the UL region corresponding to the DL region, or the first UL region spaced from the DL region by a length T after an end position of the DL region is a UL feedback region corresponding to the DL region, wherein T is predefined or configured; or the UL region corresponding to the DL region is indicated in indication information in the downlink control channel; or a UL region corresponding to a part of DL regions in a time unit is predefined or configured as a UL region in the current time unit, and if there are a plurality of UL regions in the current time unit, then the UL region corresponding to the part of the DL regions is one or more predefined or configured UL regions in the current time unit; or a UL region corresponding to a part of DL regions in a time unit is predefined or configured as a UL region in the next time unit, and if there are a plurality of UL regions in the next time unit, then the UL region corresponding to the part of the DL regions is one or more predefined or configured UL regions in the next time unit; or a UL region corresponding to a DL region in a time unit is predefined or configured as a UL region in the current time unit, and if there are a plurality of DL regions and a plurality of UL regions in the current time unit, then each DL region corresponds to one or more predefined or configured UL regions.

Optionally, the time unit is one or more slots, or one or more sub-frames.

An embodiment of the invention provides an apparatus for transmitting data, the apparatus including: a processor configured to read and execute programs in a memory to allocate DL regions in a time unit, and to notify a UE of the allocated DL regions via configuration signaling through a transceiver, wherein the time unit includes at least two DL regions; and the transceiver configured to receive and transmit data under the control of the processor.

Optionally, the processor is configured to notify the UE of the allocated DL regions via the configuration signaling by:

notifying the UE of lengths and positions of the DL regions in the time unit; or notifying the UE of one of a plurality of predefined patterns, wherein each pattern includes an allocation of lengths and positions of the DL regions in the time unit; or notifying the UE of start or end positions of the DL regions in the time unit.

Optionally, the processor is further configured to notify the UE of a UL region and/or a GP region in the time unit via the configuration signaling by: notifying the UE of a length and a position of the UL region in the time unit; or notifying the UE of one of a plurality of predefined patterns, wherein each pattern includes an allocation of a length and a position of the UL region in the time unit; or notifying the UE of a start or end position of the UL region in the time unit; or notifying the UE of indication information so that the UE determines the UL region in the time unit according to the indication information under a predefined rule.

Optionally, the UL region in the time unit is determined according to uplink scheduling signaling, or determined according to a position at which ACK/NACK for downlink transmission is fed back.

Optionally, the processor is further configured to transmit the configuration signaling via higher-layer signaling or physical downlink control signaling in a unicast or broadcast or multicast form.

Optionally, the processor is further configured to transmit a downlink control channel to the UE in at least one DL region in the time unit.

Optionally, before the downlink control channel is transmitted to the UE in at least one DL region in the time unit, the processor is further configured to: determine a detection DL region of the UE in the time unit, and notify the UE of the detection DL region via configuration information, or determine a detection DL region in the time unit according to a pre-definition, wherein the detection DL region is a part or all of the DL regions in the time unit; and when the detection DL region is configured or predefined, transmit the downlink control channel to the UE in at least one DL region in the detection DL region corresponding to the UE.

Optionally, the processor is further configured to: receive ACK/NACK feedback for the downlink control channel, and/or ACK/NACK feedback for a downlink shared channel corresponding to the downlink control channel, in a UL region corresponding to a DL region in which the downlink control channel is transmitted, when a downlink DCI format is used for the downlink control channel; or receive an uplink shared channel corresponding to the downlink control channel in a UL region corresponding to a DL region in which the downlink control channel is transmitted, when an uplink DCI format is used for the downlink control channel.

Optionally, a UL region corresponding to a DL region is determined in one or a combination of the following schemes: a region spaced from the DL region by a length T after an end position of the DL region is the UL region corresponding to the DL region, or the first UL region spaced from the DL region by a length T after an end position of the DL region is a UL feedback region corresponding to the DL region, wherein T is predefined or configured; or the UL region corresponding to the DL region is indicated in indication information in the downlink control channel; or a UL region corresponding to a part of DL regions in a time unit is predefined or configured as a UL region in the current time unit, and if there are a plurality of UL regions in the current time unit, then the UL region corresponding to the part of the DL regions is one or more predefined or configured UL regions in the current time unit; or a UL region corresponding to a part of DL regions in a time unit is predefined or configured as a UL region in the next time unit, and if there are a plurality of UL regions in the next time unit, then the UL region corresponding to the part of the DL regions is one or more predefined or configured UL regions in the next time unit; or a UL region corresponding to a DL region in a time unit is predefined or configured as a UL region in the current time unit, and if there are a plurality of DL regions and a plurality of UL regions in the current time unit, then each DL region corresponds to one or more predefined or configured UL regions.

Optionally, the time unit is one or more slots, or one or more sub-frames.

An embodiment of the invention provides an apparatus for transmitting data, the apparatus including: a processor configured to read and execute programs in a memory to receive configuration signaling through a transceiver, and determine DL regions allocated in a time unit according to the configuration signaling, wherein the time unit includes at least two DL regions; and the transceiver configured to receive and transmit data under the control of the processor.

Optionally, the processor is configured to determine the DL regions allocated in the time unit according to the configuration signaling by: determining lengths and positions of the DL regions in the time unit according to the configuration signaling; or determining one of a plurality of predefined patterns according to the configuration signaling, wherein each pattern includes an allocation of lengths and positions of the DL regions in the time unit; or determining start or end positions of the DL regions in the time unit according to the configuration signaling.

Optionally, the processor is further configured to determine a UL region and/or a GP region in the time unit according to the configuration signaling, wherein: a length and a position of the UL region in the time unit is notified via the configuration signaling; or one of a predefined patterns is notified via the configuration signaling, wherein each pattern includes an allocation of a length and a position of the UL region in the time unit; or a start or end position of the UL region in the time unit is notified via the configuration signaling; or indication information is notified via the configuration signaling so that the UE determines the UL region in the time unit according to the indication information under a predefined rule.

Optionally, the processor is further configured to: determine the UL region in the time unit according to uplink scheduling signaling, or determine the UL region in the time unit according to a position at which ACK/NACK for downlink transmission is fed back.

Optionally, the processor is further configured to receive the configuration signaling transmitted via higher-layer signaling or physical downlink control signaling, wherein the configuration signaling is transmitted in a unicast or broadcast or multicast form.

Optionally, the processor is further configured to detect each DL region or each detection DL region in the time unit for a downlink control channel.

Optionally, before each detection DL region in the time unit is detected for the downlink control channel, the processor is further configured to: receive configuration information, and determine a detection DL region in the time unit according to the configuration information, or determine a detection DL region in the time unit according to a pre-definition, wherein the detection DL region is a part or all of the DL regions in the time unit.

Optionally, the processor is further configured to: transmit ACK/NACK feedback for the downlink control channel, and/or ACK/NACK feedback for a downlink shared channel corresponding to the downlink control channel, in a UL region corresponding to a DL region in which the downlink control channel is received, when a downlink DCI format is used for the downlink control channel; or transmit an uplink shared channel corresponding to the downlink control channel in a UL region corresponding to a DL region in which the downlink control channel is received, when an uplink DCI format is used for the downlink control channel.

Optionally, a UL region corresponding to a DL region is determined in one or a combination of the following schemes: a region spaced from the DL region by a length T after an end position of the DL region is the UL region corresponding to the DL region, or the first UL region spaced from the DL region by a length T after an end position of the DL region is a UL feedback region corresponding to the DL region, wherein T is predefined or configured; or the UL region corresponding to the DL region is indicated in indication information in the downlink control channel; or a UL region corresponding to a part of DL regions in a time unit is predefined or configured as a UL region in the current time unit, and if there are a plurality of UL regions in the current time unit, then the UL region corresponding to the part of the DL regions is one or more predefined or configured UL regions in the current time unit; or a UL region corresponding to a part of DL regions in a time unit is predefined or configured as a UL region in the next time unit, and if there are a plurality of UL regions in the next time unit, then the UL region corresponding to the part of the DL regions is one or more predefined or configured UL regions in the next time unit; or a UL region corresponding to a DL region in a time unit is predefined or configured as a UL region in the current time unit, and if there are a plurality of DL regions and a plurality of UL regions in the current time unit, then each DL region corresponds to one or more predefined or configured UL regions.

Optionally, the time unit is one or more slots, or one or more sub-frames.

Advantageous effects of the invention are as follows: in the technical solutions according to the embodiments of the invention, at least two DL regions are defined in a time unit, a UE detects each DL region or a part of DL regions for downlink transmission, and when downlink transmission is detected, the UE feeds back ACK/NACK in an uplink region corresponding to the downlink region. The embodiments of the invention provide a solution to transmit data, where a time unit can be divided into a plurality of downlink regions, and each downlink region can define feedback and scheduling relationships respectively, thus improving the flexibility of scheduling and the utilization ratio of system resources.

BRIEF DESCRIPTION OF THE DRAWINGS

The drawings described here are intended to provide further understanding of the invention, and constitute a part of the invention, and the exemplary embodiments of the invention and the description thereof are intended to set forth the invention, but not to limit the invention unduly.

DETAILED DESCRIPTION OF THE EMBODIMENTS

The inventors have identified that during making of the invention: as there are a growing demand for mobile communication services, the International Telecommunication Union (ITU), the $3^{rd}$ Generation Partnership Project (3GPP), and other organizations come to research a new wireless communication system (e.g., a 5G system). The new wireless communication system can support various coexisting types of services, e.g., an enhanced Mobile Broadband (eMBB) service, an Ultra Reliable & Low Latency Communication (URLLC) service, a Massive Machine Type Communication (mMTC) service, etc., and the amount of traffic of the same service may also vary. When uplink and downlink traffic shares the same frequency resource in a Time Division Multiplexing (TDM) mode, in order to support the different types of services and demands for the amount of traffic, a flexible and varying allocation of resources shall be supported, but there has been absent so far a related solution to transmit data over dynamically allocated uplink and downlink resources.

Hereupon an embodiment of the invention provides a solution to transmit data, where at least two DL detection regions are defined in a time unit, a UE detects each detection region for downlink transmission, and when downlink transmission is detected, the UE feeds back ACK/NACK in an uplink region corresponding to the downlink region. Particular embodiments of the invention will be described below with reference to the drawings.

In the following description, implementations at the eNB side and the UE side will be described respectively, and then an example of an implementation in which both of them cooperate will be further described for better understanding of the implementations of the solutions according to the embodiments of the invention. Such a description will not suggest that both of them shall cooperate in an implementation, or they shall operate separately in an implementation, and in fact, respective problems at the eNB side and the UE side can also be addressed when they operate separately in an implementation, although a better technical effect can be achieved when both of them cooperate in an implementation.

It shall be further noted since generally the eNB side operationally corresponds to the UE side, one of the sides will be described in details, and the other side will be described in brief for the sake of conciseness, but this will not suggest there be no corresponding implementation at the other side, and those skilled in the art can readily know a corresponding implementation at the other side without any inventive effort.

Figure 1:
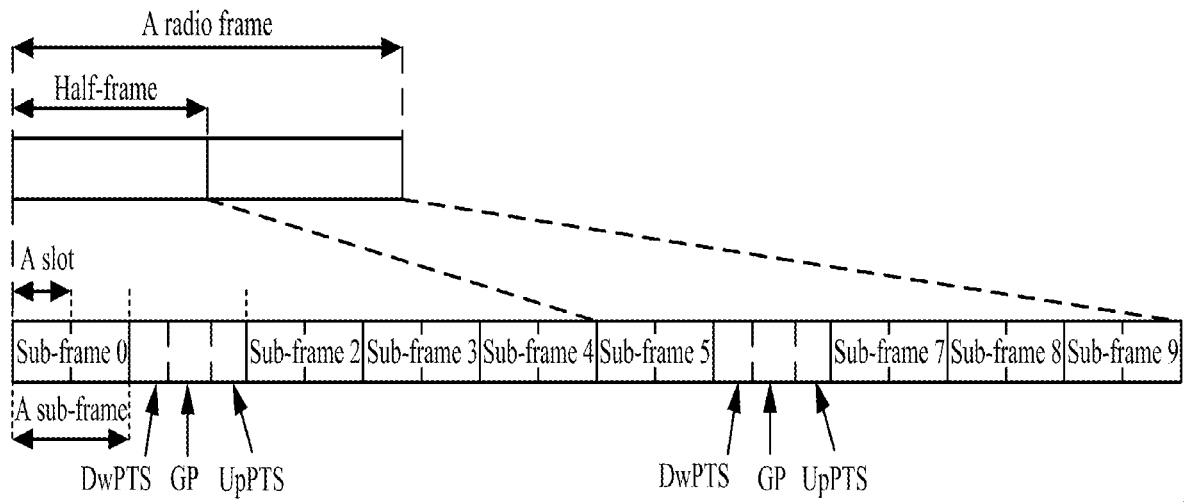
FIG. 1 is a schematic diagram of the frame structure type 2 for an LTE TDD system in the prior art.
Figure 2:
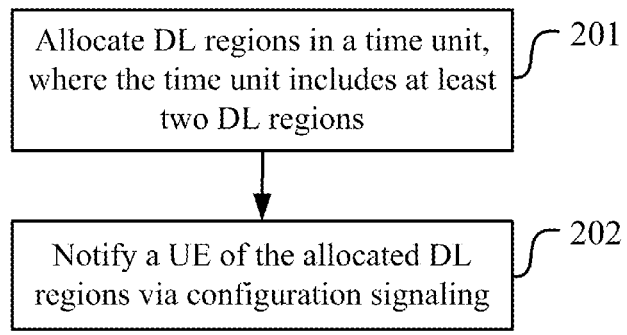
FIG. 2 is a schematic flow chart of a method for transmitting data at an eNB side according to an embodiment of the invention.

FIG. 2 is a schematic flow chart of a method for transmitting data at the eNB side according to an embodiment of the invention, and as illustrated, the method can include the following operations.

The operation 201 is to allocate DL regions in a time unit, where the time unit includes at least two DL regions.

The operation 202 is to notify a UE of the allocated DL regions via configuration signaling.

Figure 3:
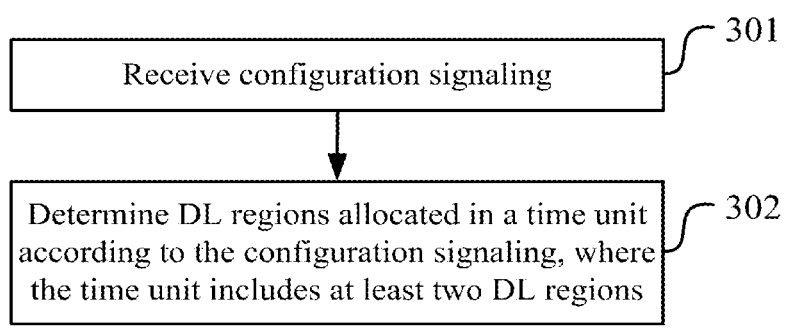
FIG. 3 is a schematic flow chart of a method for transmitting data at a UE side according to an embodiment of the invention.

FIG. 3 is a schematic flow chart of a method for transmitting data at the UE side according to an embodiment of the invention, and as illustrated, the method can include the following operations.

The operation 301 is to receive configuration signaling.

The operation 302 is to determine DL regions allocated in a time unit according to the configuration signaling, where the time unit includes at least two DL regions.

Generally, the eNB side will be described below in details.

In an implementation, notifying the UE of the allocated DL regions via the configuration signaling can particularly include: notifying the UE of lengths and positions of the DL regions in the time unit; or notifying the UE of one of a plurality of predefined patterns, where each pattern includes an allocation of lengths and positions of the DL regions in the time unit; or notifying the UE of start or end positions of the DL regions in the time unit.

Particularly, an allocation of DL regions in a time unit is determined, and the UE is notified of an allocation result via configuration signaling; where the UE is notified directly of lengths and positions of the DL regions in the time unit via the configuration signaling; or a plurality of patterns of combinations of lengths and positions of the DL regions in the time unit are predefined, and the UE is notified of one of the patterns via the configuration signaling; or the UE is notified directly of start positions of the DL regions in the time unit via the configuration signaling, and lengths of the DL regions can be obtained otherwise, e.g., through energy detection, or the UE is notified of the lengths or end positions of the DL regions via other configuration signaling; or the UE is notified directly of end positions of the DL regions in the time unit via the configuration signaling, and start positions of the DL regions can be determined through energy detection or in a predefined manner or according to a UL region and/or a GP region.

In an implementation, the UE is further notified of the UL region(s) and/or the GP region(s) in the time unit via the configuration signaling.

Particularly, if the DL and UL regions are determined, then the GP region(s) may also be determined according to the sizes of the DL and UL regions instead of being notified, and alike, if the DL and GP regions are determined, then the UL region(s) may also be determined according to the sizes of the DL and GP regions instead of being notified.

In an implementation, the UE is further notified of the UL region(s) and/or the GP region(s) in the time unit via the configuration signaling particularly as follows: the UE is notified of the length(s) and the position(s) of the UL region(s) in the time unit; or the UE is notified of one of a predefined patterns, where each pattern includes an allocation of the length(s) and the position(s) of the UL region(s) in the time unit; or the UE is notified of the start or end position(s) of the UL region(s) in the time unit; or the UE is notified of indication information so that the UE determines the UL region(s) in the time unit according to the indication information under a predefined rule.

Particularly, the UE can be further notified of an allocation of the UL region(s) and/or an allocation of the GP region(s) in the time unit via the configuration signaling as follows: the UE is notified directly of the length(s) and the position(s) of the uplink region(s) in the time unit; or a plurality of patterns of combinations of the length(s) and the position(s) of the uplink region(s) in the time unit are predefined, and the UE is notified of one of the patterns via the configuration signaling; or the UE is notified directly of the start or end position(s) of the uplink region(s) in the time unit via the configuration signaling, and the length(s) of the uplink region(s) can be obtained otherwise, e.g., notified via scheduling signaling or other configuration signaling.

In another implementation, the UL region(s) in the time unit is or are determined according to uplink scheduling signaling, or determined according to a position at which ACK/NACK for downlink transmission is fed back, that is, the uplink region(s) is or are obtained implicitly, and for example, a scheduled uplink region is determined according to uplink scheduling signaling, an uplink region for carrying ACK/NACK is determined according to the position at which the ACK/NACK for downlink transmission is fed back, etc., or the GP region(s) is are notified via configuration signaling, and the uplink region(s) is or are determined according to the GP region(s) and the downlink regions.

In an implementation, the method can further include: the UL region(s) in the time unit is or are determined according to uplink scheduling signaling, or determined according to a position at which ACK/NACK for downlink transmission is fed back.

In an implementation, the configuration signaling can be notified via higher-layer signaling or physical downlink control signaling, and the configuration signaling can be notified in a unicast or broadcast or multicast form.

Particularly, the configuration signaling can be transmitted in a unicast or broadcast or multicast form, e.g., at some periodicity, and different configuration signaling can be transmitted in different periodicities; or the configuration signaling can be transmitted via higher-layering signaling or over a downlink control channel; and the downlink control channel can be transmitted in a UE-specific Search Space (USS), or can be transmitted in a Cell-specific Search Space (CSS).

In an implementation, the method can further include: a downlink control channel is transmitted to the UE in at least one DL region in a time unit.

In an implementation, before the downlink control channel is transmitted to the UE in at least one DL region in the time unit, the method further includes: a detection DL region of the UE in a time unit is determined, and notified to the UE via configuration information, or a detection DL region in a time unit is determined according to a pre-definition, where the detection DL region can be a part or all of the DL regions in the time unit; and when the detection DL region is configured or predefined, the downlink control channel is transmitted to the UE in at least one DL region in the detection DL region corresponding to the UE.

Particularly, a downlink control channel is transmitted to the UE in at least one DL region in a time unit; a detection DL region of the UE is preconfigured, where the detection DL region can be a part or all of the DL regions; and when the detection DL region is configured, a downlink control channel is transmitted to the UE in the detection DL region corresponding to the UE.

Correspondingly, at the UE side, in an implementation, the method can further include: each DL region or each detection DL region in a time unit is detected for a downlink control channel.

In an implementation, before each DL region or each detection DL region in a time unit is detected for a downlink control channel, the method further includes: configuration information is received, and a detection DL region in a time unit is determined according to the configuration information, or a detection DL region in a time unit is determined according to a pre-definition, where the detection DL region can be a part or all of the DL regions in the time unit.

In an implementation, the method further includes: when a downlink DCI format is used for the downlink control channel, ACK/NACK feedback for the downlink control channel, and/or ACK/NACK feedback for a downlink shared channel corresponding to the downlink control channel is received in a UL region corresponding to the DL region in which the downlink control channel is transmitted; or when an uplink DCI format is used for the downlink control channel, an uplink shared channel corresponding to the downlink control channel is received in a UL region corresponding to the DL region in which the downlink control channel is transmitted.

Particularly, when a downlink DCI format is used for the downlink control channel, ACK/NACK feedback for the downlink control channel, and/or ACK/NACK feedback for a downlink shared channel corresponding to the downlink control channel is received in a UL region corresponding to the DL region in which the downlink control channel is transmitted; and when an uplink DCI format is used for the downlink control channel, an uplink shared channel corresponding to the downlink control channel is received in a UL region corresponding to the DL region in which the downlink control channel is transmitted.

Correspondingly at the UE side, in an implementation, the method further includes: when a downlink DCI format is used for the downlink control channel, ACK/NACK feedback for the downlink control channel, and/or ACK/NACK feedback for a downlink shared channel corresponding to the downlink control channel is transmitted in a UL region corresponding to the DL region in which the downlink control channel is transmitted; or when an uplink DCI format is used for the downlink control channel, an uplink shared channel corresponding to the downlink control channel is transmitted in a UL region corresponding to the DL region in which the downlink control channel is transmitted.

Particularly, when the UE detects downlink transmission (including a downlink control channel and a downlink shared channel, for which ACK/NACK is to be fed back; where the downlink shared channel includes a downlink shared channel with a corresponding downlink control channel, and a downlink shared channel without any corresponding downlink control channel) in a DL region, the UE feeds back ACK/NACK for the downlink transmission, in a UL region corresponding to the DL region; and when the UE detects a downlink control channel in an uplink DCI format in a DL region, the UE transmits an uplink shared channel corresponding to the downlink control channel in a UL region corresponding to the DL region.

In an implementation, a UL region corresponding to a DL region can be determined in one or a combination of the following schemes: a region spaced from the DL region by a length T after an end position of the DL region is a UL region corresponding to the DL region, or the first UL region spaced from the DL region by a length T after an end position of the DL region is a UL feedback region corresponding to the DL region, where T is predefined or configured.

Particularly, a region spaced from a DL region by a length T after an end position of the DL region is a UL region corresponding to the DL region, or the first UL region spaced from a DL region by a length T after an end position of the DL region is a UL feedback region corresponding to the DL region, where lengths T corresponding to respective DL regions may or may not be the same, and a sum of a length of a DL region, a length T, and a length of a corresponding UL region may be less than or equal to or greater than a length of a time unit; and T is predefined or configured; and when T is configured, it can be configured semi-statically via higher-layer signaling, or can be indicated in the downlink control channel (e.g., as a feedback time sequence or a feedback delay or a scheduling time sequence or a scheduling delay).

Alternatively, a UL region corresponding to a DL region is indicated in indication information in the downlink control channel.

Particularly, a UL region corresponding to a DL region is determined according to indication information in the downlink control channel, and for example, the indication information indicates a time domain position of the UL region directly, e.g., the number of a symbol, a micro-slot, a slot, a sub-frame, etc., or can indicate a delay in addition to a predefined processing delay, where a region or the first UL region satisfying the processing delay and the delay after the end position of the downlink region is determined as a UL region corresponding to the DL region according to the delay and the processing delay.

Alternatively, a UL region corresponding to a part of DL regions in a time unit is predefined or configured as a UL region in the current time unit, and if there are a plurality of UL regions in the current time unit, then the UL region corresponding to the part of the DL regions will be one or more predefined or configured UL regions in the current time unit.

Alternatively, a UL region corresponding to a part of DL regions in a time unit is predefined or configured as a UL region in the next time unit, and if there are a plurality of UL regions in the next time unit, then the UL region corresponding to the part of the DL regions will be one or more predefined or configured UL regions in the next time unit.

Particularly, a UL region corresponding to the first a DL regions in a time unit can be predefined or configured as a UL region in the current time unit, that is, ACK/NACK for downlink transmission in the first a DL regions in the time unit is fed back in a UL region in the time unit, that is, a downlink control channel in an uplink DCI format in the first a DL regions in the time unit schedules an uplink shared channel to be transmitted in a UL region in the time unit; and if there are a plurality of UL regions in the time unit, then a UL region corresponding to the first a DL regions in the time unit will be a UL region predefined or configured in the current time unit, and for example, predefined or configured as the last UL region in the current time unit. A UL region corresponding to the last b DL regions in a time unit is predefined or configured as a UL region in the next time unit, that is, ACK/NACK for downlink transmission in the last b DL regions in the time unit is fed back in a UL region in the next time unit, that is, a downlink control channel in an uplink DCI format in the last b DL regions in the time unit schedules an uplink shared channel to be transmitted in a UL region in the next time unit; and if there are a plurality of UL regions in the next time unit, then a UL region corresponding to the last b DL regions in the time unit will be a UL region predefined or configured in the next time unit, and for example, predefined or configured as the first UL region in the next time unit.

For example, when there are two DL regions and one UL region in a time unit, the first DL region in the first time unit can be defined to correspond to a UL region in the time unit, and the second DL region in the first time unit can be defined to correspond to a UL region in the next time unit; and in another example, when there are two DL regions and two UL regions in a time unit, the first DL region in a time unit can be defined to correspond to the second UL region in the time unit, and the second DL region in a time unit can be defined to correspond to the first UL region in the next time unit.

Other definitions will not be precluded, and when there are more DL and UL regions in a time unit, a similar definition will apply.

Alternatively, a UL region corresponding to a DL region in a time unit is predefined or configured as a UL region in the current time unit, and if there are a plurality of DL regions, and a plurality of UL regions in the current time unit, then each DL region will correspond to one or more predefined or configured UL regions.

Particularly, for example, when there are two DL regions and two UL regions in a time unit, then the first DL region may be defined to correspond to the first UL region, and the second DL region may be defined to correspond to the second UL region. The same will apply to other numbers of DL regions and UL regions.

In an implementation, the method can further include: a feedback delay or a feedback time sequence or a feedback position index is indicated in the downlink control channel for the UE to determine a resource for feeding back ACK/NACK in a corresponding UL region; and/or, a scheduling delay or a scheduling time sequence or a scheduling position index is indicated in the downlink control channel for the UE to determine a resource for transmitting an uplink shared channel in a corresponding UL region.

Particularly, the downlink control channel can indicate a feedback delay or a feedback time sequence or a feedback position index for the UE to determine a resource (e.g., a symbol or a mini-slot) for feeding back ACK/NACK in a corresponding UL region; and the downlink control channel can indicate a scheduling delay or a scheduling time sequence or a scheduling position index for the UE to determine a resource (e.g., a symbol or a mini-slot) for transmitting an uplink shared channel in a corresponding UL region.

In an implementation, a time unit can be one or more slots, or one or more sub-frames.

In a particular implementation, a plurality of DL regions in a time unit may or may not be adjacent (they are spaced by a GP between the current downlink transmission and uplink feedback of the current UE, and there may also be DL or UL transmission of another UE in the GP).

The sizes of respective DL regions in a time unit may or may not be the same; and for example, there are two symbols in the first DL region, and three symbols in the second DL region.

For different services, there may be different numbers of DL region and UL regions in a time unit; and for example, there are one DL region and one UL region in a time unit for an eMBB service, and two DL regions and two UL regions in a time unit for a URLLC service. For different services, a correspondence relationship between a DL region and a UL region may or may not be the same.

There may be one or more slots, or one or more sub-frames in a time unit.

For a particular implementation, reference can be made to the description of the implementation at the eNB side.

Particular examples of an implementation in which the eNB side and the UE side cooperate with each other will be further described below.

In the drawings according to the embodiments of the invention, "AN" refers to Acknowledgement/Negative Acknowledgement (ACK/NACK).

The First Embodiment is as follows.

Figure 4:
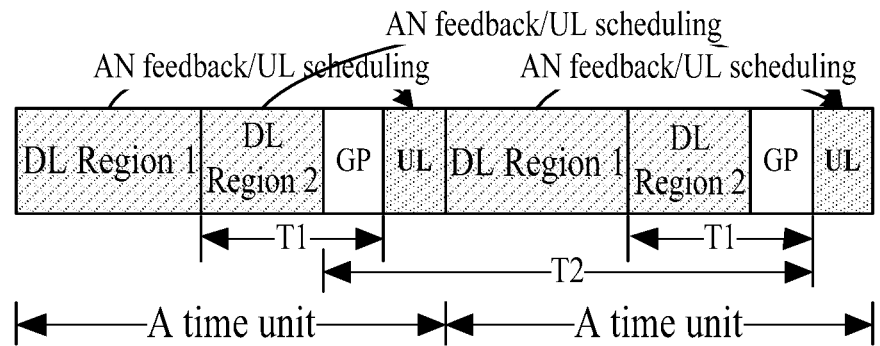
FIG. 4 is a schematic diagram of an allocation of and a correspondence relationship between uplink and downlink resources of a system with a TA and/or a switching period of time according to a first embodiment of the invention.
Figure 5:
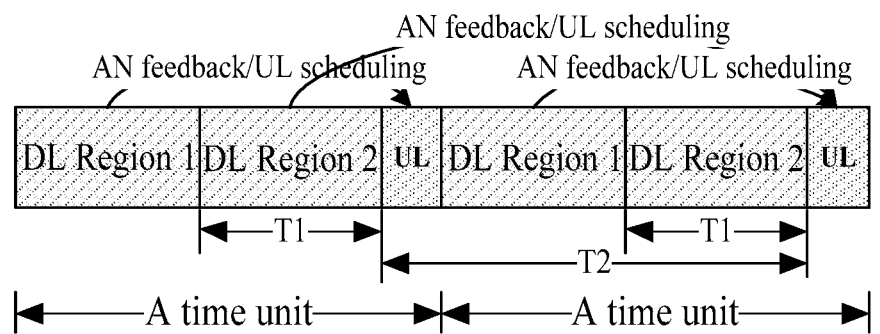
FIG. 5 is a schematic diagram of an allocation of and a correspondence relationship between uplink and downlink resources of a system without any TA and/or switching period of time according to the first embodiment of the invention.

FIG. 4 is a schematic diagram of an allocation of and a correspondence relationship between uplink and downlink resources of a system with a TA and/or a switching period of time according to a first embodiment of the invention, and FIG. 5 is a schematic diagram of an allocation of and a correspondence relationship between uplink and downlink resources of a system without any TA and/or switching period of time according to the first embodiment of the invention. As illustrated in FIG. 4, for example, an eNB decides to divide a time unit into two DL regions and one UL region, and there is such a blank region or a GP region between a DL region and the UL region that is a reserved region determined to satisfy a Timing Advance (TA) demand of the UL, a switching period of time from the DL to the UL, etc., possibly taking into account interference between adjacent cells, and other factors. Of course, if a TA or a switching period of time or anti-interference is not required, then there may be no blank component or GP component as illustrated in FIG. 5. A correspondence relationship between the DL regions and the UL region can be predefined or configured directly, and for example, the first DL region in a time unit is predefined or configured to schedule uplink transmission in the UL region in the time unit (where uplink transmission in the UL region may occupy only a part of Orthogonal Frequency Division Multiplexing (OFDM) or Single-Carrier Frequency Division Multiple Access (SC-FDMA) symbols or a part of mini-slots in the UL region, so a plurality of uplink shared channels of the same or different UEs can be transmitted in a UL region in a Time Division Multiplexing (TDM) mode, or uplink transmission in the UL region may occupy the length of the entire UL region, and the same will apply hereinafter), the second DL region in a time unit is predefined or configured to schedule uplink transmission in the UL region in the next time unit, ACK/NACK for downlink transmission in the first DL region in a time unit (where downlink transmission in the DL region may occupy only a part of OFDM symbols or a part of mini-slots in the DL region, so a plurality of downlink transmission instances of the same or different UEs can be transmitted in a DL region in a TDM mode, or downlink transmission in the DL region may occupy the length of the entire DL region) is fed back in the UL region in the time unit (an uplink channel carrying ACK/NACK feedback information for downlink transmission may occupy only a part of OFDM or SC-OFDM symbols or a part of mini-slots in the UL region, so a plurality of uplink channels, carrying ACK/NACK, of the same or different UEs can be transmitted in a UL region in a TDM mode, or the uplink channel may occupy the length of the entire UL region, and the same will apply hereinafter), and ACK/NACK for downlink transmission in the second DL region in a time unit is fed back in the UL region in the next time unit, as illustrated in FIG. 4 and FIG. 5. Of course, alternatively the value of T can be predefined or configured, and an UL region spaced from a DL region by a period T of time after the DL region can be defined as a corresponding UL region, for the same effect of the correspondence relationship predefined or configured as above, as illustrated in FIG. 4 and FIG. 5. The length of T may vary from one DL region to another, and the value of T for defining a scheduling relationship may or may not be the same as the value of T for defining a feedback relationship. When a time unit is divided differently into DL and UL regions, the corresponding value of T will also be different, and for example, there are different allocations of DL and UL regions for different services. In this embodiment, a time unit can be a slot or a sub-frame; or course, alternatively a time unit with another length can be defined.

The eNB can notify a UE of the division above in the following implementations.

In an implementation, the eNB notifies the UE via higher-layer signaling.

In another implementation, the eNB transmits configuration signaling over a specific resource in a predefined DL region in each time unit, or one of a plurality of time units (e.g., the first N OFDM symbols in a time unit), where the configuration signaling can be transmitted over a data channel (e.g., like a System Information Block (SIB)), or can be transmitted in a control channel (e.g., in a preset Downlink Control Information (DCI) format in a common search space).

The UE can be notified directly of the size and the position of each DL region, and the size of the UL region can be determined implicitly according to whether there is a demand for feedback or uplink transmission; or the UE can be notified of the size and the position of each DL region, and the size and the position of the UL region, or can be notified of the size and the position of each DL region, and the size and the position of the GP; or the UE can be notified of the size and the position of the UL region, and the size and the position of the GP. Of course, alternatively a plurality of patterns of combinations of the sizes and the positions of DL regions, an UL region, and a GP region in a time unit can be predefined, and one of the patterns can be indicated via signaling.

The UE receives the configuration signaling, and determines a corresponding allocation of DL regions in a time unit to determine a specific component to be detected for a downlink control channel, where the UE can further determine an allocation of a UL region according to the notification, or implicitly determine the UL region directly according to a scheduling relationship, dependent upon how the eNB configures it.

The eNB to schedule the UE selects at least one DL region in a time unit, and transmits a downlink control channel to the UE in a downlink control channel search space of the selected DL region to schedule the UE to receive a downlink shared channel in the selected DL region, or to transmit an uplink shared channel in a corresponding UL region.

For example, in a first scenario, the eNB transmits a downlink control channel 1 in a downlink DCI format in a DL region 1 to schedule a UE 1 to receive a downlink shared channel 1 in the DL region 1, and transmits a downlink control channel 2 in the downlink DCI format in a DL region 2 to schedule a UE 2 to receive a downlink shared channel 2 in the DL region 2.

In another example, in a second scenario, the eNB transmits a downlink control channel 1-1 in a downlink DCI format in a DL region 1 to schedule a UE 1 to receive a downlink shared channel 1-1 in the DL region 1, transmits a downlink control channel 2-1 in the downlink DCI format in the DL region 1 to schedule a UE 2 to receive a downlink shared channel 2-1 in the DL region 1, transmits control channel 1-2 in the downlink DCI format in a DL region 2 to schedule the UE 1 to receive a downlink shared channel 1-2 in the DL region 2, and transmits a downlink control channel 2-2 in the downlink DCI format in the DL region 2 to schedule the UE 2 to receive a downlink shared channel 2-2 in the DL region 2.

In another example, in a third scenario, the eNB transmits a downlink control channel 1 in an uplink DCI format in a DL region 1 to schedule a UE 1 to transmit an uplink shared channel 1 in the UL region in the time unit, and transmits a downlink control channel 2 in the uplink DCI format in a DL region 2 to schedule a UE 2 to transmit an uplink shared channel 2 in the UL region in the next time unit.

In another example, in a fourth scenario, the eNB transmits a downlink control channel 1-1 in an uplink DCI format in a DL region 1 to schedule a UE 1 to transmit an uplink shared channel 1-1 in the UL region in the time unit, transmits a downlink control channel 2-1 in the uplink DCI format in the DL region 1 to schedule a UE 2 to transmit an uplink shared channel 2-1 in the UL region in the time unit, transmits a downlink control channel 1-2 in the uplink DCI format in a DL region 2 to schedule the UE 1 to transmit an uplink shared channel 1-2 in the UL region in the next time unit, and transmits a downlink control channel 2-2 in the uplink DCI format in the DL region 2 to schedule the UE 2 to transmit an uplink shared channel 2-2 in the UL region in the next time unit.

Of course, the scenarios above can exist in combination, and for example, for each UE, there may be both uplink and downlink scheduled transmission, that is, there may be both the first and third scenarios, or both the second and fourth scenarios; and in another example, for a UE, the eNB can transmit a downlink control channel (which includes a downlink control channel in an uplink or downlink DCI format, and the same will apply hereafter) thereto in only one DL region in a time unit, and transmit downlink control channels thereto in both of two DL regions in another time unit.

Of course, the eNB can further pre-configure a DL region to be detected by the UE, and this configuration can be made semi-statically via Radio Resource Control (RRC) signaling, or can be made by transmitting configuration signaling periodically, where the periodicity can be changed as needed in reality; and for example, a part of UEs are configured to detect only the DL region 1 for a downlink control channel, and the other UEs are configured to detect only the DL region 2 for a downlink control channel, so if the eNB is going into schedule uplink or downlink transmission of the UEs, then it will transmit downlink control channels of these UEs in only the DL detection areas configured for these UEs.

The UE detects blindly each DL region in a time unit for a downlink control channel according to the determined allocation of DL and UL regions; when a downlink control channel of the UE in a downlink DCI format is detected, the UE receives a corresponding downlink shared channel in the DL region, generates ACK/NACK feedback information ("AN" feedback as illustrated) for the downlink shared channel, and makes ACK/NACK feedback in a UL region corresponding to the DL region; and if ACK/NACK feedback is made for a plurality of DL regions in the same corresponding UL region, then ACK/NACK feedback information in the plurality of DL regions may be fed back over the same uplink channel in the UL region, or may be fed back over different uplink channels, where if there are different uplink channels, then they may be uplink channels transmitted at different instances of time, or may be uplink channels transmitted over different frequency resources at the same instance of time, or may be uplink channels transmitted over the same time and frequency resource in a code division mode. When a downlink control channel of the UE in an uplink DCI format is detected, the UE transmits a corresponding uplink shared channel in a UL region corresponding to the DL region.

Figure 6:
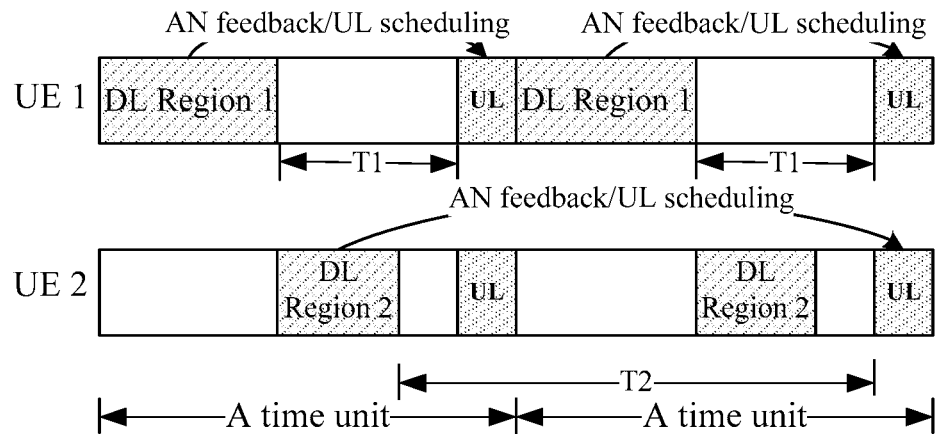
FIG. 6 is a schematic diagram of a first or third instance at a UE side with a TA and/or a switching period of time according to the first embodiment of the invention.
Figure 7:
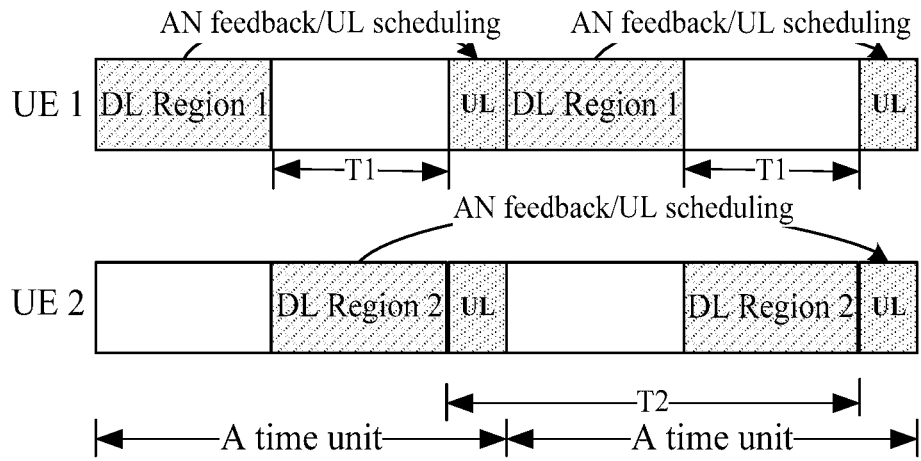
FIG. 7 is a schematic diagram of the first or third instance at a UE side without any TA and/or switching period of time according to the first embodiment of the invention.

For example, in correspondence to the first scenario at the eNB side, the UE 1 detects the DL regions 1 and 2 for a downlink control channel in a downlink DCI format, and only detects a downlink control channel 1 in the downlink DCI format in the DL region 1, so the UE 1 receives a corresponding downlink shared channel 1 in the DL region 1 according to scheduling information carried over the downlink control channel 1, generates ACK/NACK feedback information, and makes ACK/NACK feedback in the UL region in the time unit; and the UE 2 detects the DL regions 1 and 2 for a downlink control channel in a downlink DCI format, and only detects a downlink control channel 2 in the downlink DCI format in the DL region 2, so the UE 2 receives a corresponding downlink shared channel 2 in the DL region 2 according to scheduling information carried over the downlink control channel 2, generates ACK/NACK feedback information, and makes ACK/NACK feedback in the UL region in the next time unit. At this time, transmission patterns of the UE 1 and the UE 2 are as illustrated in the "AN" feedback relationships in FIG. 6 and FIG. 7, where FIG. 6 is a schematic diagram of the first or third scenario at the UE side with a TA and/or a switching period of time in the first embodiment, and FIG. 7 is a schematic diagram of the first or third scenario at the UE side without any TA and/or switching period of time in the first embodiment.

Figure 8:
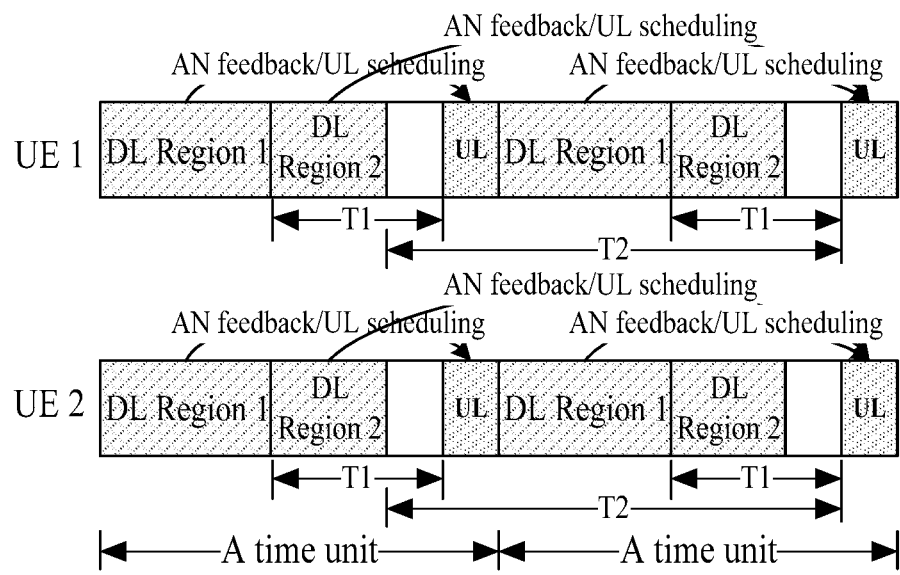
FIG. 8 is a schematic diagram of a second or fourth instance at a UE side with a TA and/or a switching period of time according to the first embodiment of the invention.
Figure 9:
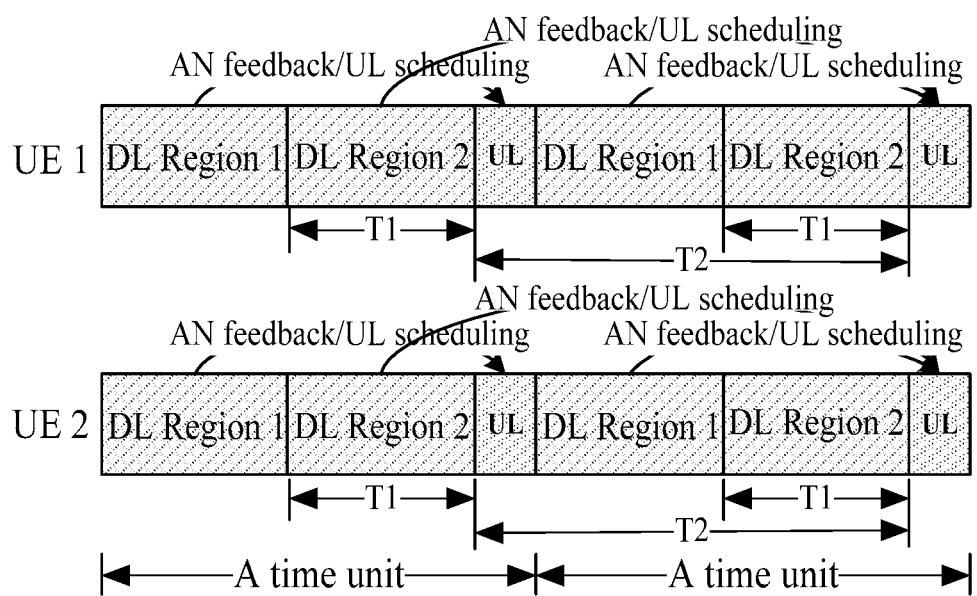
FIG. 9 is a schematic diagram of the second or fourth instance at a UE side without any TA and/or switching period of time according to the first embodiment of the invention.

For example, in correspondence to the second scenario at the eNB side, the UE 1 detects the DL regions 1 and 2 for a downlink control channel in a downlink DCI format, and detects a downlink control channel 1-1 in the downlink DCI format in the DL region 1, so the UE 1 receives a corresponding downlink shared channel 1-1 in the DL region 1 according to scheduling information carried over the downlink control channel 1-1, generates ACK/NACK feedback information, and makes ACK/NACK feedback in the UL region in the time unit; and the UE 1 detects a downlink control channel 1-2 in the downlink DCI format in the DL region 2, so the UE 2 receives a corresponding downlink shared channel 1-2 in the DL region 2 according to scheduling information carried over the downlink control channel 1-2, generates ACK/NACK feedback information, and makes ACK/NACK feedback in the UL region in the next time unit. The UE 2 detects the DL regions 1 and 2 for a downlink control channel in a downlink DCI format, and detects a downlink control channel 2-1 in the downlink DCI format in the DL region 1, so the UE 2 receives a corresponding downlink shared channel 2-1 in the DL region 1 according to scheduling information carried over the downlink control channel 2-1, generates ACK/NACK feedback information, and makes ACK/NACK feedback in the UL region in the time unit; and the UE 2 detects a downlink control channel 2-2 in the downlink DCI format in the DL region 2, so the UE 2 receives a corresponding downlink shared channel 2-2 in the DL region 2 according to scheduling information carried over the downlink control channel 2-2, generates ACK/NACK feedback information, and makes ACK/NACK feedback in the UL region in the next time unit. At this time, transmission patterns of the UE 1 and the UE 2 are as illustrated in the "AN" feedback relationships in FIG. 8 and FIG. 9, where FIG. 8 is a schematic diagram of the second or fourth scenario at the UE side with a TA and/or a switching period of time in the first embodiment, and FIG. 9 is a schematic diagram of the second or fourth scenario at the UE side without any TA and/or switching period of time in the first embodiment.

For example, in correspondence to the third scenario at the eNB side, the UE 1 detects the DL regions 1 and 2 for a downlink control channel in an uplink DCI format, and only detects a downlink control channel 1 in the uplink DCI format in the DL region 1, so the UE 1 transmits a corresponding uplink shared channel 1 in the UL region in the time unit according to scheduling information carried over the downlink control channel 1; and the UE 2 detects the DL regions 1 and 2 for a downlink control channel in an uplink DCI format, and only detects a downlink control channel 2 in the uplink DCI format in the DL region 2, so the UE 2 transmits a corresponding uplink shared channel 2 in the UL region in the next time unit according to scheduling information carried over the downlink control channel 2. At this time, transmission patterns of the UE 1 and the UE 2 are as illustrated in the UL scheduling relationships in FIG. 6 and FIG. 7.

For example, in correspondence to the fourth scenario at the eNB side, the UE 1 detects the DL regions 1 and 2 for a downlink control channel in an uplink DCI format, and detects a downlink control channel 1-1 in the uplink DCI format in the DL region 1, so the UE 1 transmits a corresponding uplink shared channel 1-1 in the UL region in the time unit according to scheduling information carried over the downlink control channel 1-1; and the UE 1 detects a downlink control channel 1-2 in the uplink DCI format in the DL region 2, so the UE 1 transmits a corresponding uplink shared channel 1-2 in the UL region in the next time unit according to scheduling information carried over the downlink control channel 1-2. The UE 2 detects the DL regions 1 and 2 for a downlink control channel in an uplink DCI format, and detects a downlink control channel 2-1 in the uplink DCI format in the DL region 1, so the UE 2 transmits a corresponding uplink shared channel 2-1 in the UL region in the time unit according to scheduling information carried over the downlink control channel 2-1; and the UE 2 detects a downlink control channel 2-2 in the uplink DCI format in the DL region 2, so the UE 2 transmits a corresponding uplink shared channel 2-2 in the UL region in the next time unit according to scheduling information carried over the downlink control channel 2-2. At this time, transmission patterns of the UE 1 and the UE 2 are as illustrated in the UL scheduling relationships in FIG. 8 and FIG. 9.

Of course, particular reception at the UE depends upon real scheduling by the eNB, and there may be a combination of the scenarios above. For example, for each UE, there may be both uplink and downlink scheduled transmission, that is, there may be both the first and third scenarios, or both the second and fourth scenarios; and in another example, a UE can detect only one DL region for a downlink control channel (which includes a downlink control channel in an uplink or downlink DCI format, and the same will apply hereinafter) in a time unit, and detect both of two DL regions for a downlink control channel in another time unit.

Of course, if the eNB pre-configures a DL region to be detected by the UE, then the UE may detect only the configured DL region for a downlink control channel, and then make ACK/NACK feedback and/or transmit an uplink shared channel in a UL region corresponding to the DL region according to the detected downlink control channel. For example, the UE 1 is configured to detect only the DL region 1 for a downlink control channel, so the UE 1 detects only the DL region 1 for a downlink control channel, and decides to make ACK/NACK feedback and/or to transmit an uplink shared channel in the UL region in the time unit according to the detected downlink control channel; and the UE 2 is configured to detect only the DL region 2 for a downlink control channel, so the UE 2 detects only the DL region 2 for a downlink control channel, and decides to make ACK/NACK feedback and/or to transmit an uplink shared channel in the UL region in the next time unit according to the detected downlink control channel.

The eNB side receives ACK/NACK feedback information corresponding to downlink transmission in a DL region, and/or an uplink shared channel, scheduled by a downlink control channel in an uplink DCI format, transmitted in the DL region, in a corresponding UL region according to the downlink control channel transmitted by the eNB.

Figure 10:
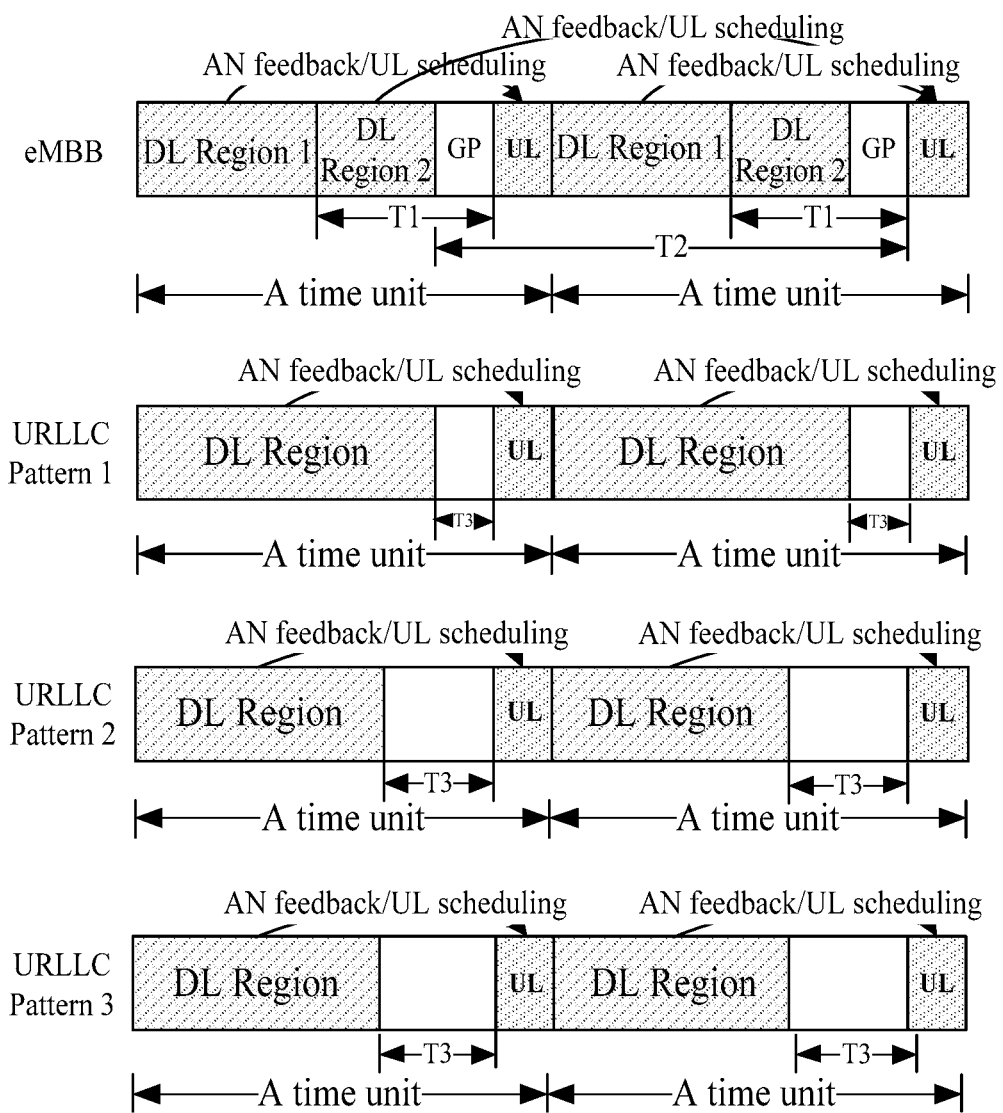
FIG. 10 is a schematic diagram of an allocation of and a correspondence relationship between uplink and downlink resources of a system with a TA and/or a switching period of time according to the first embodiment of the invention in different services.
Figure 11:
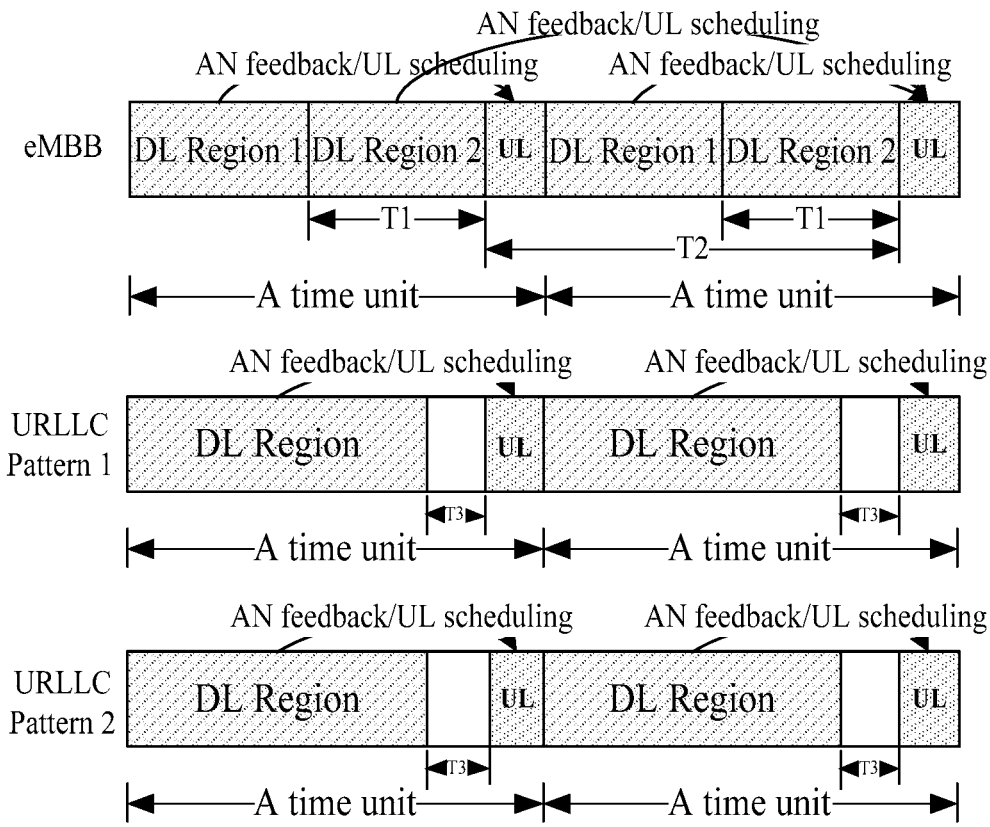
FIG. 11 is a schematic diagram of an allocation of and a correspondence relationship between uplink and downlink resources of a system without any TA and/or switching period of time according to the first embodiment of the invention in different services.

FIG. 10 is a schematic diagram of an allocation of and a correspondence relationship between the uplink and downlink resources of the system with a TA and/or a switching period of time according to the first embodiment of the invention in different services, and FIG. 11 is a schematic diagram of an allocation of and a correspondence relationship between the uplink and downlink resources of the system without any TA and/or switching period of time according to the first embodiment of the invention in different services. For example, when the pattern in this embodiment is defined for a corresponding eMBB service, if there is also a URLLC service in the system, then the patterns as illustrated in FIG. 10 and FIG. 11 may be defined for the URLLC service, that is, only one DL region and one UL region are defined in a time unit, where the DL region is the entire DL region of the eMBB service, or a subset thereof, and the UL region is the entire UL region of the eMBB service, or a subset thereof, or more than the UL region of the eMBB service, dependent upon feedback, a scheduling delay, a real demand, etc., in the URLLC service as long as feedback can be made, or an uplink shared channel can be transmitted, in the UL region in the current time unit for the last downlink scheduling unit, so that uplink scheduling or downlink feedback can be made in one time unit for the URLLC service. Of course, alternatively a uniform allocation of DL and UL regions can be defined for the eMBB and URLLC services in the system, so that the eMBB service operates according to the feedback and scheduling relationships corresponding to the process above, and downlink transmission of the URLLC service in respective DL regions in a time unit can be feedback in the UL region in the current time unit, or downlink control channels in an uplink DCI format in respective DL regions in a time unit can schedule uplink shared channels to be transmitted in the UL region in the current time unit, that is, at this time, the relationship between a DL end position and a UL start position in a time unit of the URLLC service is required to satisfy the demands for feedback and a scheduling delay, so that feedback and uplink scheduling can be made in the current time unit for all the DL regions to thereby shorten the scheduling and feedback delays; and there is the same operating flow of the URLLC service as described above according to the DL regions and the feedback/scheduling relationship defined for the URLLC service except that different feedback and scheduling delays are defined, so a repeated description thereof will be omitted here.

The Second Embodiment is as follows.

Figure 12:
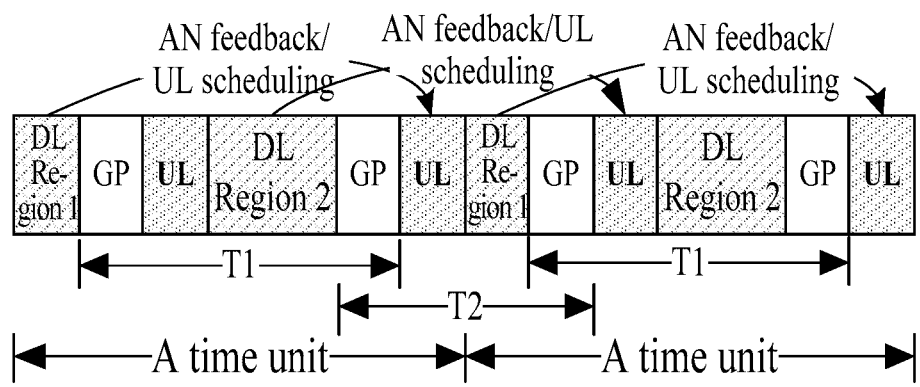
FIG. 12 is a schematic diagram of an allocation of and a correspondence relationship between uplink and downlink resources of a system with a TA and/or a switching period of time according to a second embodiment of the invention.
Figure 13:
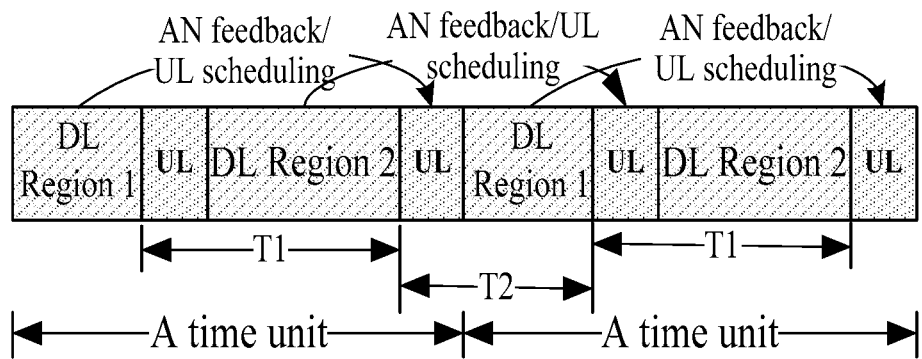
FIG. 13 is a schematic diagram of an allocation of and a correspondence relationship between uplink and downlink resources of a system without any TA and/or switching period of time according to the second embodiment of the invention.

FIG. 12 is a schematic diagram of an allocation of and a correspondence relationship between uplink and downlink resources of a system with a TA and/or a switching period of time according to a second embodiment of the invention, and FIG. 13 is a schematic diagram of an allocation of and a correspondence relationship between uplink and downlink resources of a system without any TA and/or switching period of time according to the second embodiment of the invention. As illustrated in FIG. 12, for example, an eNB decides to divide a time unit into two DL regions and two UL regions, and there is such a blank region or a GP region between a DL region and an UL region that is a reserved region determined to satisfy a TA demand of the UL, a switching period of time from the DL to the UL, etc., possibly taking into account interference between adjacent cells, and other factors. Of course, if a TA or a switching period of time or anti-interference is not required, then there may be no blank component or GP component as illustrated in FIG. 13. A correspondence relationship between the DL regions and the UL regions can be predefined or configured directly, and for example, the first DL region in a time unit is predefined or configured to schedule uplink transmission in the second (last) UL region in the time unit (where uplink transmission in the UL region may occupy only a part of OFDM or SC-FDMA symbols or a part of mini-slots in the UL region, so a plurality of uplink shared channels of the same or different UEs can be transmitted in a UL region in a TDM mode; or uplink transmission in the UL region may occupy the length of the entire UL region, and the same will apply hereinafter), the second (last) DL region in a time unit is predefined or configured to schedule uplink transmission in the first UL region in the next time unit, ACK/NACK for downlink transmission in the first DL region in a time unit (where downlink transmission in the DL region may occupy only a part of OFDM symbols or a part of mini-slots in the DL region, so a plurality of downlink transmission instances of the same or different UEs can be transmitted in a DL region in a TDM mode; or downlink transmission in the DL region may occupy the length of the entire DL region) is fed back in the second (last) UL region in the time unit (an uplink channel carrying ACK/NACK feedback information for downlink transmission may occupy only a part of OFDM or SC-OFDM symbols or a part of mini-slots in the UL region, so a plurality of uplink channels, carrying ACK/NACK, of the same or different UEs can be transmitted in a UL region in a TDM mode; or the uplink channel may occupy the length of the entire UL region, and the same will apply hereinafter), and ACK/NACK for downlink transmission in the second DL region in a time unit is fed back in the first UL region in the next time unit, as illustrated in FIG. 12 and FIG. 13. Of course, alternatively the value of T can be predefined or configured, and an UL region spaced from a DL region by a period T of time after the DL region can be defined as a corresponding UL region, for the same effect of the correspondence relationship predefined or configured as above, as illustrated in FIG. 12 and FIG. 13. The length of T may vary from one DL region to another, and the value of T for defining a scheduling relationship may or may not be the same as the value of T for defining a feedback relationship. When a time unit is divided differently into DL and UL regions, the corresponding value of T will also be different, and for example, there are different allocations of DL and UL regions, and thus different corresponding values of T, for different services. In this embodiment, a time unit can be a slot or a sub-frame; or course, alternatively a time unit with another length can be defined.

The eNB notifies a UE of the division, particularly as described in the first embodiment, so a repeated description thereof will be omitted here.

The UE receives the configuration signaling, and determines a corresponding allocation of DL regions in a time unit to determine a specific component to be detected for a downlink control channel, where the UE can further determine an allocation of UL regions according to the notification, or implicitly determine the UL regions directly according to a scheduling relationship, dependent upon how the eNB configures it.

The eNB to schedule the UE selects at least one DL region in a time unit, and transmits a downlink control channel to the UE in a downlink control channel search space of the selected DL region to schedule the UE to receive a downlink shared channel in the selected DL region, or to transmit an uplink shared channel in a corresponding UL region.

For example, in a first scenario, the eNB transmits a downlink control channel 1 in a downlink DCI format in a DL region 1 to schedule a UE 1 to receive a downlink shared channel 1 in the DL region 1, and transmits a downlink control channel 2 in the downlink DCI format in a DL region 2 to schedule a UE 2 to receive a downlink shared channel 2 in the DL region 2.

In another example, in a second scenario, the eNB transmits a downlink control channel 1-1 in a downlink DCI format in a DL region 1 to schedule a UE 1 to receive a downlink shared channel 1-1 in the DL region 1, transmits a downlink control channel 2-1 in the downlink DCI format in the DL region 1 to schedule a UE 2 to receive a downlink shared channel 2-1 in the DL region 1, transmits a downlink control channel 1-2 in the downlink DCI format in a DL region 2 to schedule the UE 1 to receive a downlink shared channel 1-2 in the DL region 2, and transmits a downlink control channel 2-2 in the downlink DCI format in the DL region 2 to schedule the UE 2 to receive a downlink shared channel 2-2 in the DL region 2.

In another example, in a third scenario, the eNB transmits a downlink control channel 1 in an uplink DCI format in a DL region 1 to schedule a UE 1 to transmit an uplink shared channel 1 in a UL region 2 in the time unit, and transmits a downlink control channel 2 in the uplink DCI format in a DL region 2 to schedule a UE 2 to transmit an uplink shared channel 2 in a UL region 1 in the next time unit.

In another example, in a fourth scenario, the eNB transmits a downlink control channel 1-1 in an uplink DCI format in a DL region 1 to schedule a UE 1 to transmit an uplink shared channel 1-1 in a UL region 2 in the time unit, transmits a downlink control channel 2-1 in the uplink DCI format in the DL region 1 to schedule a UE 2 to transmit an uplink shared channel 2-1 in the UL region 2 in the time unit, transmits a downlink control channel 1-2 in the uplink DCI format in a DL region 2 to schedule the UE 1 to transmit an uplink shared channel 1-2 in a UL region 1 in the next time unit, and transmits a downlink control channel 2-2 in the uplink DCI format in the DL region 2 to schedule the UE 2 to transmit an uplink shared channel 2-2 in the UL region 1 in the next time unit.

Of course, the scenarios above can exist in combination, and for example, for each UE, there may be both uplink and downlink scheduled transmission, that is, there may be both the first and third scenarios, or both the second and fourth scenarios; and in another example, for a UE, the eNB can transmit a downlink control channel (which includes a downlink control channel in an uplink or downlink DCI format, and the same will apply hereafter) thereto in only one DL region in a time unit, and transmit downlink control channels thereto in both of two DL regions in another time unit.

Of course, the eNB can further pre-configure a DL region to be detected by the UE, and this configuration can be made semi-statically via RRC signaling, or can be made by transmitting configuration signaling periodically, where the periodicity can be changed as needed in reality; and for example, a part of UEs are configured to detect only the DL region 1 for a downlink control channel, and the other UEs are configured to detect only the DL region 2 for a downlink control channel, so if the eNB is going into schedule uplink or downlink transmission of the UEs, then it will transmit downlink control channels of these UEs in only the DL detection areas configured for these UEs.

The UE detects blindly each DL region in a time unit for a downlink control channel according to the determined allocation of DL and UL regions; when a downlink control channel of the UE in a downlink DCI format is detected, the UE receives a corresponding downlink shared channel in the DL region, generates ACK/NACK feedback information ("AN" feedback as illustrated) for the downlink shared channel, and makes ACK/NACK feedback in a UL region corresponding to the DL region; and if ACK/NACK feedback is made for a plurality of DL regions in the same corresponding UL region, then ACK/NACK feedback information in the plurality of DL regions may be fed back over the same uplink channel in the UL region, or may be fed back over different uplink channels, where if there are different uplink channels, then they may be uplink channels transmitted at different instances of time, or may be uplink channels transmitted over different frequency resources at the same instance of time, or may be uplink channels transmitted over the same time and frequency resource in a code division mode. When a downlink control channel of the UE in an uplink DCI format is detected, the UE transmits a corresponding uplink shared channel in a UL region corresponding to the DL region.

Figure 14:
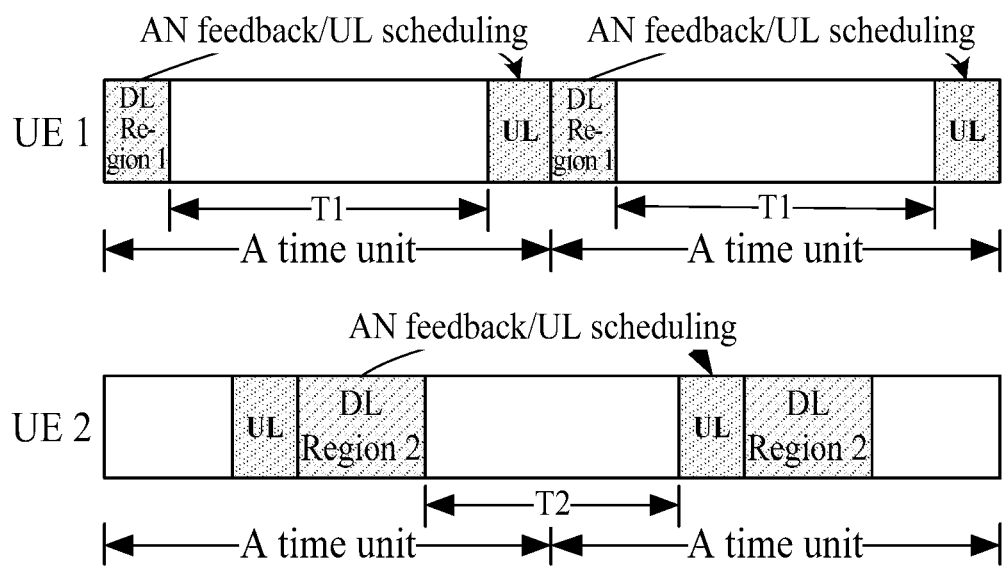
FIG. 14 is a schematic diagram of a first or third instance at a UE side with a TA and/or a switching period of time according to the second embodiment of the invention.
Figure 15:
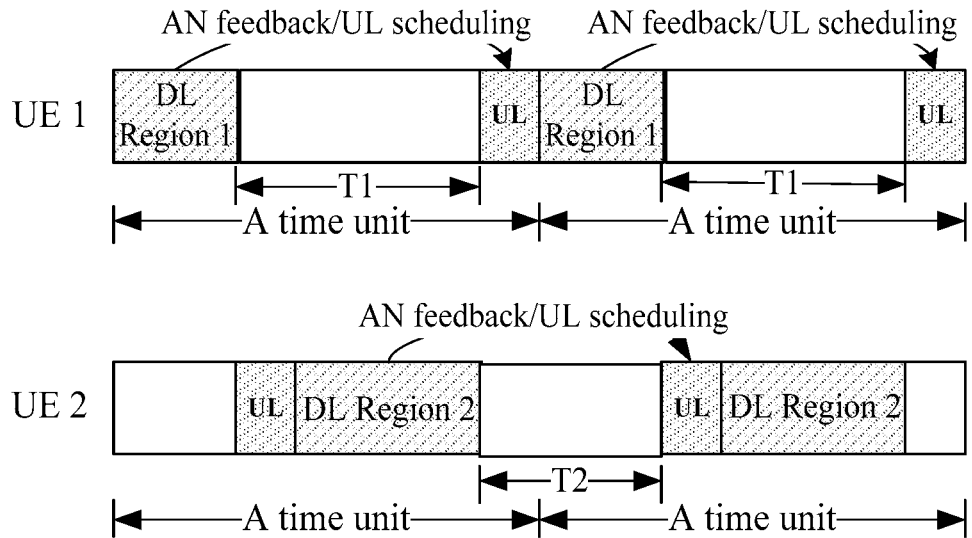
FIG. 15 is a schematic diagram of the first or third instance at a UE side without any TA and/or switching period of time according to the second embodiment of the invention.

For example, in correspondence to the first scenario at the eNB side, the UE 1 detects the DL regions 1 and 2 for a downlink control channel in a downlink DCI format, and only detects a downlink control channel 1 in the downlink DCI format in the DL region 1, so the UE 1 receives a corresponding downlink shared channel 1 in the DL region 1 according to scheduling information carried over the downlink control channel 1, generates ACK/NACK feedback information, and makes ACK/NACK feedback in the UL region 2 in the time unit; and the UE 2 detects the DL regions 1 and 2 for a downlink control channel in a downlink DCI format, and only detects a downlink control channel 2 in the downlink DCI format in the DL region 2, so the UE 2 receives a corresponding downlink shared channel 2 in the DL region 2 according to scheduling information carried over the downlink control channel 2, generates ACK/NACK feedback information, and makes ACK/NACK feedback in the UL region 1 in the next time unit. At this time, transmission patterns of the UE 1 and the UE 2 are as illustrated in the "AN" feedback relationships in FIG. 14 and FIG. 15, where FIG. 14 is a schematic diagram of the first or third scenario at the UE side with a TA and/or a switching period of time in the second embodiment, and FIG. 15 is a schematic diagram of the first or third scenario at the UE side without any TA and/or switching period of time in the second embodiment.

Figure 16:
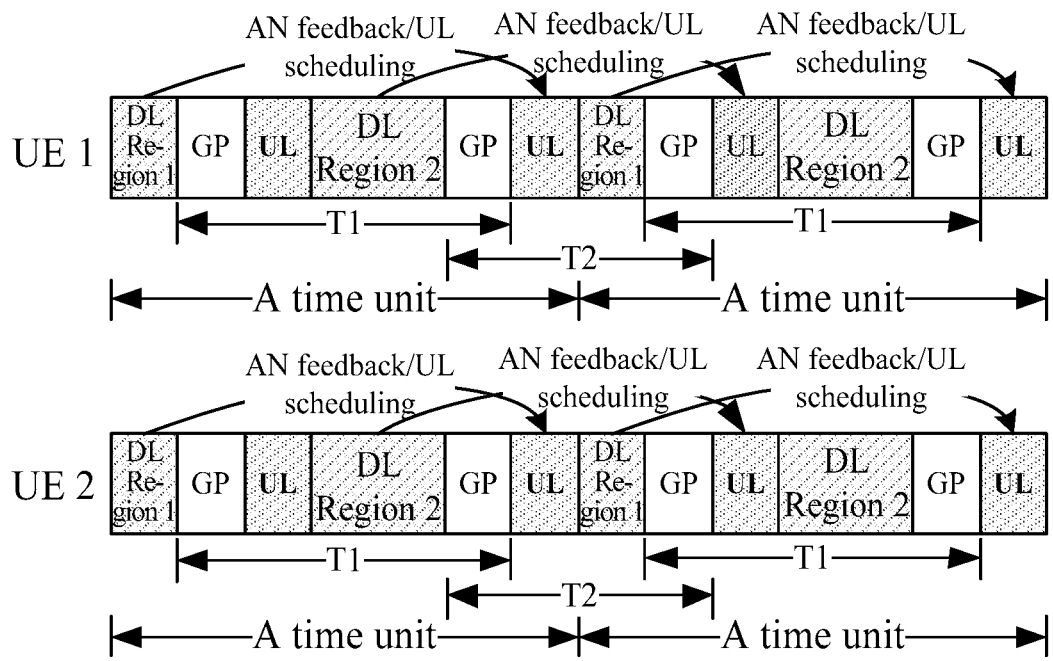
FIG. 16 is a schematic diagram of a second or fourth instance at a UE side with a TA and/or a switching period of time according to the first embodiment of the invention.
Figure 17:
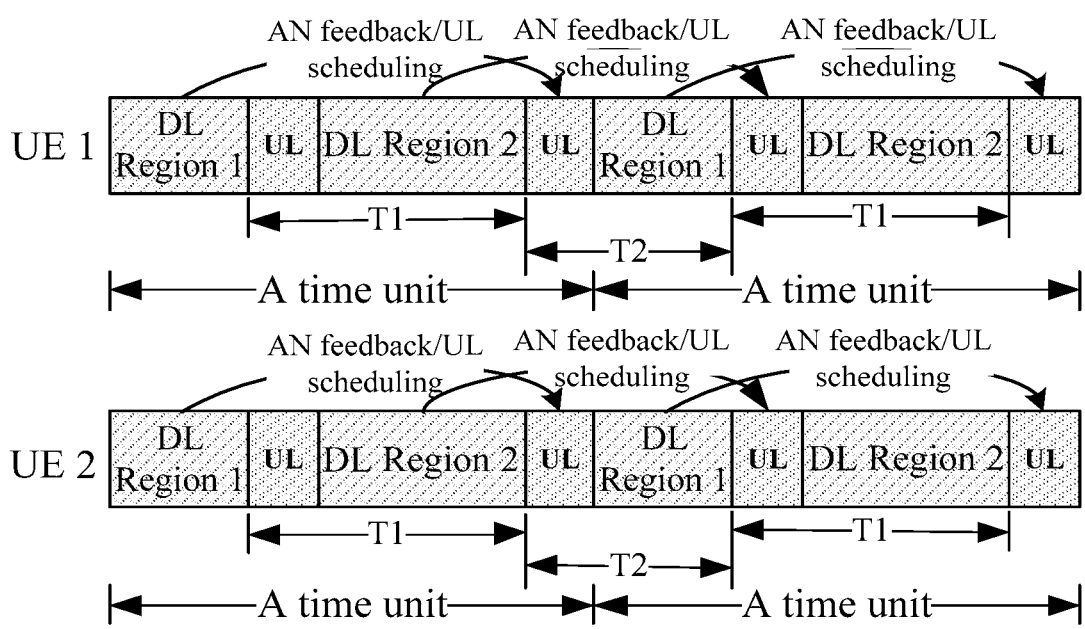
FIG. 17 is a schematic diagram of the second or fourth instance at a UE side without any TA and/or switching period of time according to the second embodiment of the invention.

For example, in correspondence to the second scenario at the eNB side, the UE 1 detects the DL regions 1 and 2 for a downlink control channel in a downlink DCI format, and detects a downlink control channel 1-1 in the downlink DCI format in the DL region 1, so the UE 1 receives a corresponding downlink shared channel 1-1 in the DL region 1 according to scheduling information carried over the downlink control channel 1-1, generates ACK/NACK feedback information, and makes ACK/NACK feedback in the UL region 2 in the time unit; and the UE 1 detects a downlink control channel 1-2 in the downlink DCI format in the DL region 2, so the UE 1 receives a corresponding downlink shared channel 1-2 in the DL region 2 according to scheduling information carried over the downlink control channel 1-2, generates ACK/NACK feedback information, and makes ACK/NACK feedback in the UL region 1 in the next time unit. The UE 2 detects the DL regions 1 and 2 for a downlink control channel in a downlink DCI format, and detects a downlink control channel 2-1 in the downlink DCI format in the DL region 1, so the UE 2 receives a corresponding downlink shared channel 2-1 in the DL region 1 according to scheduling information carried over the downlink control channel 2-1, generates ACK/NACK feedback information, and makes ACK/NACK feedback in the UL region 2 in the time unit; and the UE 2 detects a downlink control channel 2-2 in the downlink DCI format in the DL region 2, so the UE 2 receives a corresponding downlink shared channel 2-2 in the DL region 2 according to scheduling information carried over the downlink control channel 2-2, generates ACK/NACK feedback information, and makes ACK/NACK feedback in the UL region 1 in the next time unit. At this time, transmission patterns of the UE 1 and the UE 2 are as illustrated in the "AN" feedback relationships in FIG. 16 and FIG. 17, where FIG. 16 is a schematic diagram of the second or fourth scenario at the UE side with a TA and/or a switching period of time in the second embodiment, and FIG. 17 is a schematic diagram of the second or fourth scenario at the UE side without any TA and/or switching period of time in the second embodiment.

For example, in correspondence to the third scenario at the eNB side, the UE 1 detects the DL regions 1 and 2 for a downlink control channel in an uplink DCI format, and only detects a downlink control channel 1 in the uplink DCI format in the DL region 1, so the UE 1 transmits a corresponding uplink shared channel 1 in the UL region 2 in the time unit according to scheduling information carried over the downlink control channel 1; and the UE 2 detects the DL regions 1 and 2 for a downlink control channel in an uplink DCI format, and only detects a downlink control channel 2 in the uplink DCI format in the DL region 2, so the UE 2 transmits a corresponding uplink shared channel 2 in the UL region 1 in the next time unit according to scheduling information carried over the downlink control channel 2. At this time, transmission patterns of the UE 1 and the UE 2 are as illustrated in the UL scheduling relationships in FIG. 14 and FIG. 15.

For example, in correspondence to the fourth scenario at the eNB side, the UE 1 detects the DL regions 1 and 2 for a downlink control channel in an uplink DCI format, and detects a downlink control channel 1-1 in the uplink DCI format in the DL region 1, so the UE 1 transmits a corresponding uplink shared channel 1-1 in the UL region 2 in the time unit according to scheduling information carried over the downlink control channel 1-1; and the UE 1 detects a downlink control channel 1-2 in the uplink DCI format in the DL region 2, so the UE 1 transmits a corresponding uplink shared channel 1-2 in the UL region 1 in the next time unit according to scheduling information carried over the downlink control channel 1-2. The UE 2 detects the DL regions 1 and 2 for a downlink control channel in an uplink DCI format, and detects a downlink control channel 2-1 in the uplink DCI format in the DL region 1, so the UE 2 transmits a corresponding uplink shared channel 2-1 in the UL region 2 in the time unit according to scheduling information carried over the downlink control channel 2-1; and the UE 2 detects a downlink control channel 2-2 in the uplink DCI format in the DL region 2, so the UE 2 transmits a corresponding uplink shared channel 2-2 in the UL region 1 in the next time unit according to scheduling information carried over the downlink control channel 2-2. At this time, transmission patterns of the UE 1 and the UE 2 are as illustrated in the UL scheduling relationships in FIG. 16 and FIG. 17.

Of course, particular reception at the UE depends upon real scheduling by the eNB, and there may be a combination of the scenarios above. For example, for each UE, there may be both uplink and downlink scheduled transmission, that is, there may be both the first and third scenarios, or both the second and fourth scenarios; and in another example, a UE can detect only one DL region for a downlink control channel (which includes a downlink control channel in an uplink or downlink DCI format, and the same will apply hereinafter) in a time unit, and detect both of two DL regions for a downlink control channel in another time unit.

Of course, if the eNB pre-configures a DL region to be detected by the UE, then the UE may detect only the configured DL region for a downlink control channel, and then make ACK/NACK feedback and/or transmit an uplink shared channel in a UL region corresponding to the DL region according to the detected downlink control channel. For example, the UE 1 is configured to detect only the DL region 1 for a downlink control channel, so the UE 1 detects only the DL region 1 for a downlink control channel, and decides to make ACK/NACK feedback and/or to transmit an uplink shared channel in a UL region in the time unit according to the detected downlink control channel; and the UE 2 is configured to detect only the DL region 2 for a downlink control channel, so the UE 2 detects only the DL region 2 for a downlink control channel, and decides to make ACK/NACK feedback and/or to transmit an uplink shared channel in a UL region in the next time unit according to the detected downlink control channel.

The eNB side receives ACK/NACK feedback information corresponding to downlink transmission in the DL region, and/or the uplink shared channel, scheduled by the downlink control channel in the uplink DCI format, transmitted in the DL region, in the corresponding UL region according to the downlink control channel transmitted by the eNB.

Figure 18:
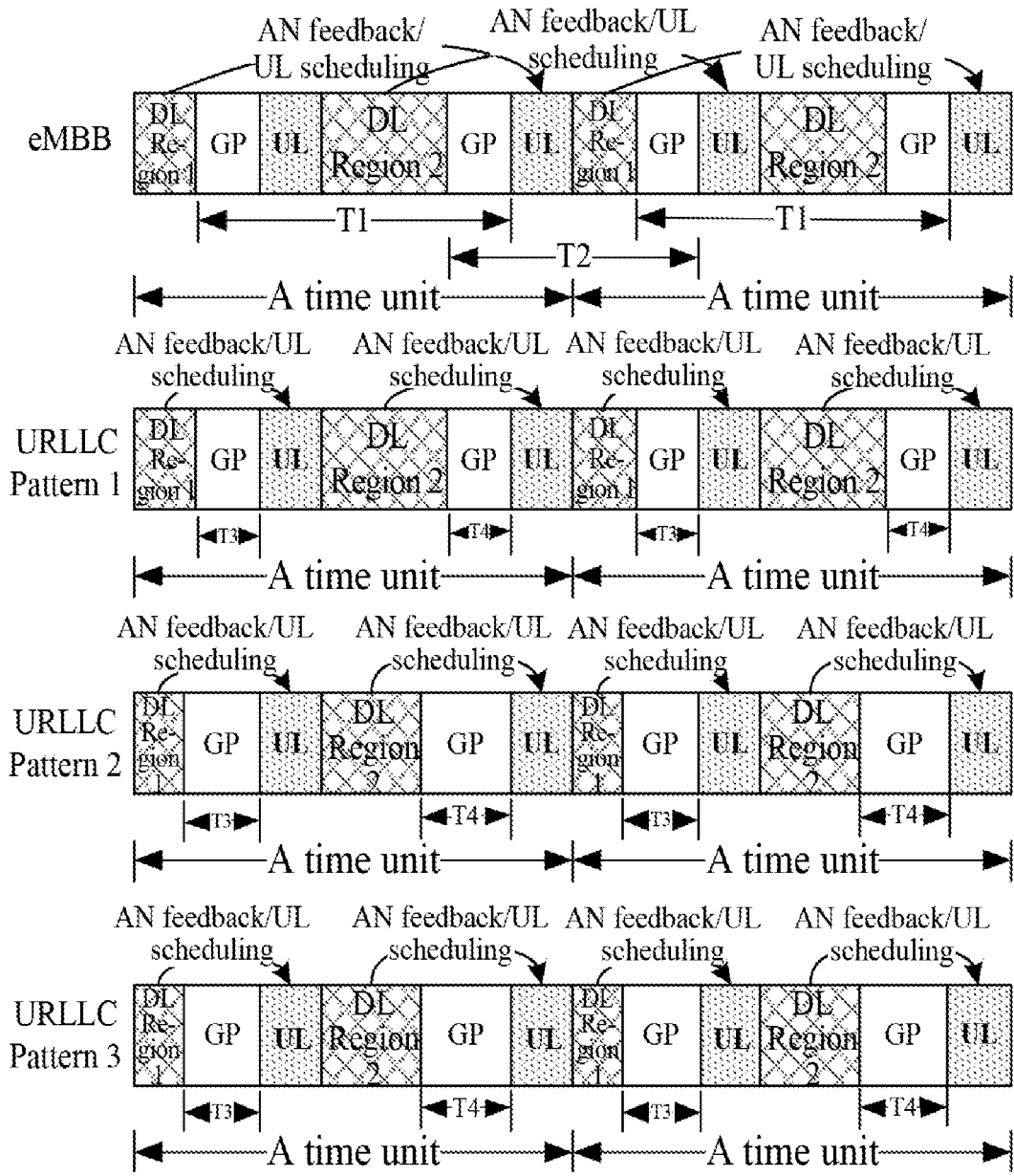
FIG. 18 is a schematic diagram of an allocation of and a correspondence relationship between uplink and downlink resources of a system with a TA and/or a switching period of time according to the second embodiment of the invention in different services.
Figure 19:
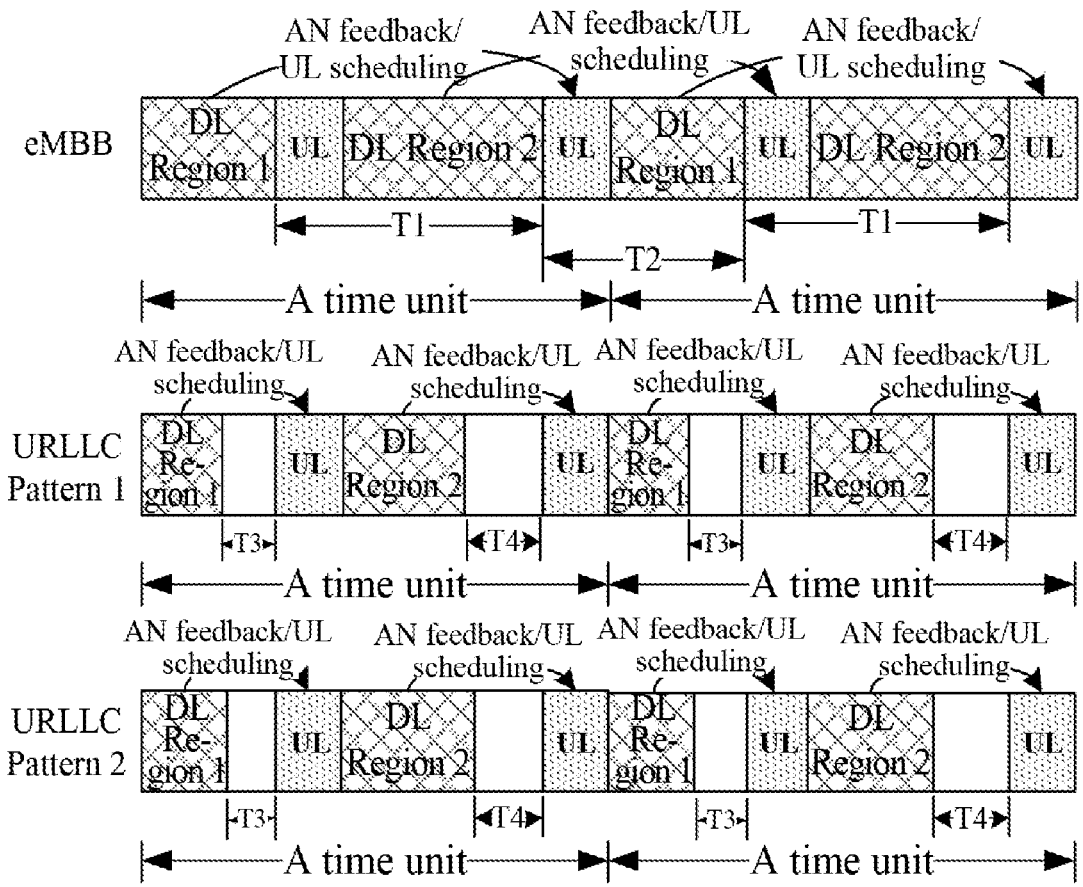
FIG. 19 is a schematic diagram of an allocation of and a correspondence relationship between uplink and downlink resources of a system without any TA and/or switching period of time according to the second embodiment of the invention in different services.

FIG. 18 is a schematic diagram of an allocation of and a correspondence relationship between uplink and downlink resources of a system with a TA and/or a switching period of time according to the second embodiment of the invention in different services, and FIG. 19 is a schematic diagram of an allocation of and a correspondence relationship between uplink and downlink resources of a system without a TA and/or a switching period of time according to the second embodiment of the invention in different services. For example, when the pattern in this embodiment is defined for a corresponding eMBB service, if there is also a URLLC service in the system, then the patterns as illustrated in FIG. 18 and FIG. 19 may be defined for the URLLC service, that is, only one DL region and one UL region are defined in a time unit, where the DL region is the entire DL region of the eMBB service, or a subset thereof, and the UL region is the entire UL region of the eMBB service, or a subset thereof, or more than the UL region of the eMBB service, dependent upon feedback, a scheduling delay, a real demand, etc., in the URLLC service as long as feedback can be made, or an uplink shared channel can be transmitted, in the UL region in the current time unit for the last downlink scheduling unit, so that uplink scheduling or downlink feedback can be made in one time unit for the URLLC service. Of course, alternatively a uniform allocation of DL and UL regions can be defined for the eMBB and URLLC services in the system, so that the eMBB service operates according to the feedback and scheduling relationships corresponding to the process above, and downlink transmission of the URLLC service in respective DL regions in a time unit can be transmitted in a UL region in the current time unit, or downlink control channels in an uplink DCI format in respective DL regions in a time unit can schedule uplink shared channels to be transmitted in a UL region in the current time unit, that is, at this time, the relationship between a DL end position and a UL start position in a time unit of the URLLC service is required to satisfy the demands for feedback and a scheduling delay, so that feedback and uplink scheduling can be made in the current time unit for all the DL regions to thereby shorten the scheduling and feedback delays; and there is the same operating flow of the URLLC service as described above according to the DL regions and the feedback/scheduling relationship defined for the URLLC service except that different feedback and scheduling delays are defined, so a repeated description thereof will be omitted here.

Based upon the same inventive idea, embodiments of the invention further provide apparatuses for transmitting data, and since these apparatuses address the problem under a similar principle to the methods for transmitting data, reference can be made to the implementations of the methods for implementations of these apparatuses, and a repeated description will be omitted here.

Figure 20:
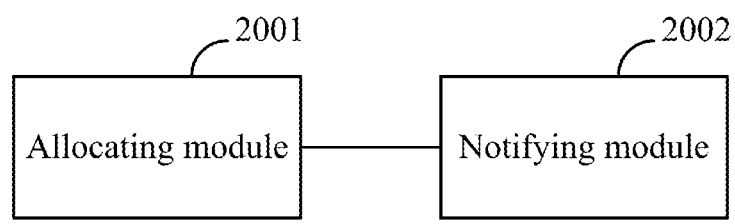
FIG. 20 is a schematic structural diagram of an apparatus for transmitting data at an eNB side according to an embodiment of the invention.

FIG. 20 is a schematic structural diagram of an apparatus for transmitting data at the eNB side according to an embodiment of the invention, and as illustrated, the apparatus can include: an allocating module 2001 configured to allocate DL regions in a time unit, where the time unit includes at least two DL regions; and a notifying module 2002 configured to notify a UE of the allocated DL regions via configuration signaling.

In an implementation, the notifying module is configured to notify the UE of the allocated DL regions via the configuration signaling by: notifying the UE of lengths and positions of the DL regions in the time unit; or notifying the UE of one of a plurality of predefined patterns, where each pattern includes an allocation of lengths and positions of the DL regions in the time unit; or notifying the UE of start or end positions of the DL regions in the time unit.

In an implementation, the notifying module is further configured to notify the UE of the UL region(s) and/or the GP region(s) in the time unit via the configuration signaling by: notifying the UE of the length(s) and the position(s) of the UL region(s) in the time unit; or notifying the UE of one of a predefined patterns, where each pattern includes an allocation of the length(s) and the position(s) of the UL region(s) in the time unit; or notifying the UE of the start or end position(s) of the UL region(s) in the time unit; or notifying the UE of indication information so that the UE determines the UL region(s) in the time unit according to the indication information under a predefined rule.

In an implementation, in the apparatus: the UL region(s) in the time unit is or are determined according to uplink scheduling signaling, or determined according to a position at which ACK/NACK for downlink transmission is fed back.

In an implementation, the notifying module is further configured to transmit the configuration signaling via higher-layer signaling or physical downlink control signaling in a unicast or broadcast or multicast form.

In an implementation, the apparatus further includes: a transmitting module configured to transmit a downlink control channel to the UE in at least one DL region in a time unit.

In an implementation, before the downlink control channel is transmitted to the UE in at least one DL region in the time unit, the transmitting module is further configured to: determine a detection DL region of the UE in the time unit, and notify the UE of the detection DL region via configuration information, or determine a detection DL region in the time unit according to a pre-definition, where the detection DL region can be a part or all of the DL regions in the time unit; and when the detection DL region is configured or predefined, transmit the downlink control channel to the UE in at least one DL region in the detection DL region corresponding to the UE.

In an implementation, the transmitting module is further configured, when a downlink DCI format is used for the downlink control channel, to receive ACK/NACK feedback for the downlink control channel, and/or ACK/NACK feedback for a downlink shared channel corresponding to the downlink control channel, in a UL region corresponding to a DL region in which the downlink control channel is transmitted; or when an uplink DCI format is used for the downlink control channel, to receive an uplink shared channel corresponding to the downlink control channel in a UL region corresponding to a DL region in which the downlink control channel is transmitted.

In an implementation, a UL region corresponding to a DL region is determined in one or a combination of the following schemes.

A region spaced from the DL region by a length T after an end position of the DL region is the UL region corresponding to the DL region, or the first UL region spaced from the DL region by a length T after an end position of the DL region is a UL feedback region corresponding to the DL region, where T is predefined or configured.

Or, the UL region corresponding to the DL region is indicated in indication information in the downlink control channel.

Or, a UL region corresponding to a part of DL regions in a time unit is predefined or configured as a UL region in the current time unit, and if there are a plurality of UL regions in the current time unit, then the UL region corresponding to the part of the DL regions is one or more predefined or configured UL regions in the current time unit.

Or, a UL region corresponding to a part of DL regions in a time unit is predefined or configured as a UL region in the next time unit, and if there are a plurality of UL regions in the next time unit, then the UL region corresponding to the part of the DL regions is one or more predefined or configured UL regions in the next time unit.

Or, a UL region corresponding to a DL region in a time unit is predefined or configured as a UL region in the current time unit, and if there are a plurality of DL regions and a plurality of UL regions in the current time unit, then each DL region corresponds to one or more predefined or configured UL regions.

In an implementation, a time unit is one or more slots, or one or more sub-frames.

Figure 21:
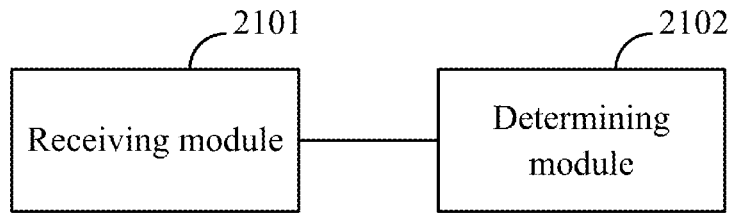
FIG. 21 is a schematic structural diagram of an apparatus for transmitting data at a UE side according to an embodiment of the invention.

FIG. 21 is a schematic structural diagram of an apparatus for transmitting data at the UE side according to an embodiment of the invention, and as illustrated, the apparatus can include: a receiving module 2101 configured to receive configuration signaling; and a determining module 2102 configured to determine DL regions allocated in a time unit according to the configuration signaling, where the time unit includes at least two DL regions.

In an implementation, the determining module is configured to determine the DL regions allocated in the time unit according to the configuration signaling by: determining lengths and positions of the DL regions in the time unit according to the configuration signaling; or determining one of a plurality of predefined patterns according to the configuration signaling, where each pattern includes an allocation of lengths and positions of the DL regions in the time unit; or determining start or end positions of the DL regions in the time unit according to the configuration signaling.

In an implementation, the determining module is further configured to: determine the UL region(s) and/or the GP region(s) in the time unit according to the configuration signaling, where: the length(s) and the position(s) of the UL region(s) in the time unit is or are notified via the configuration signaling; or one of a predefined patterns is notified via the configuration signaling, where each pattern includes an allocation of the length(s) and the position(s) of the UL region(s) in the time unit; or the start or end position(s) of the UL region(s) in the time unit is or are notified via the configuration signaling; or indication information is notified via the configuration signaling so that the UE determines the UL region(s) in the time unit according to the indication information under a predefined rule.

In an implementation, the determining module is further configured to: determine the UL region(s) in the time unit according to uplink scheduling signaling, or determine the UL region(s) in the time unit according to a position at which ACK/NACK for downlink transmission is fed back.

In an implementation, the receiving module is further configured to receive the configuration signaling transmitted via higher-layer signaling or physical downlink control signaling in a unicast or broadcast or multicast form.

In an implementation, the apparatus further includes: a detecting module configured to detect each DL region or each detection DL region in a time unit for a downlink control channel.

In an implementation, before each detection DL region in the time unit is detected for the downlink control channel, the detecting module is further configured to: receive configuration information, and determine a detection DL region in the time unit according to the configuration information, or determine a detection DL region in the time unit according to a pre-definition, where the detection DL region can be a part or all of the DL regions in the time unit.

In an implementation, the detecting module is further configured, when a downlink DCI format is used for the downlink control channel, to transmit ACK/NACK feedback for the downlink control channel, and/or ACK/NACK feedback for a downlink shared channel corresponding to the downlink control channel, in a UL region corresponding to a DL region in which the downlink control channel is received; or when an uplink DCI format is used for the downlink control channel, to transmit an uplink shared channel corresponding to the downlink control channel in a UL region corresponding to a DL region in which the downlink control channel is received.

In an implementation, a UL region corresponding to a DL region is determined in one or a combination of the following schemes.

A region spaced from the DL region by a length T after an end position of the DL region is the UL region corresponding to the DL region, or the first UL region spaced from the DL region by a length T after an end position of the DL region is a UL feedback region corresponding to the DL region, where T is predefined or configured.

Or, the UL region corresponding to the DL region is indicated in indication information in the downlink control channel.

Or, a UL region corresponding to a part of DL regions in a time unit is predefined or configured as a UL region in the current time unit, and if there are a plurality of UL regions in the current time unit, then the UL region corresponding to the part of the DL regions is one or more predefined or configured UL regions in the current time unit.

Or, a UL region corresponding to a part of DL regions in a time unit is predefined or configured as a UL region in the next time unit, and if there are a plurality of UL regions in the next time unit, then the UL region corresponding to the part of the DL regions is one or more predefined or configured UL regions in the next time unit.

Or, a UL region corresponding to a DL region in a time unit is predefined or configured as a UL region in the current time unit, and if there are a plurality of DL regions and a plurality of UL regions in the current time unit, then each DL region corresponds to one or more predefined or configured UL regions.

In an implementation, a unit is one or more slots, or one or more sub-frames.

For the sake of a convenient description, the respective components of the apparatuses above have been functionally described respectively as respective modules or units. Of course, the functions of the respective modules or units can be performed in the same one or more pieces of software or hardware in an implementation of the invention.

The technical solutions according to the embodiments of the invention can be embodied as follows.

Figure 22:
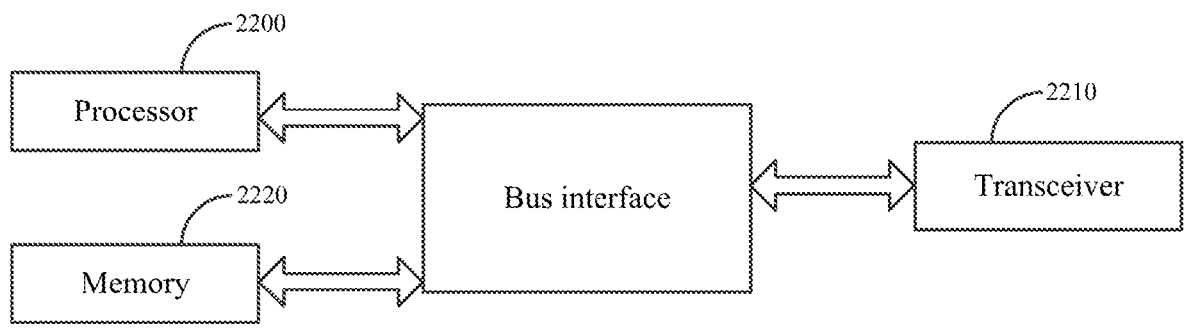
FIG. 22 is a schematic structural diagram of an eNB according to an embodiment of the invention.

FIG. 22 is a schematic structural diagram of an eNB according to an embodiment of the invention, and as illustrated, the eNB includes: a processor 2200 configured to read and execute programs in a memory 2220 to allocate DL regions in a time unit, where the time unit includes at least two DL regions; and a transceiver 2210 configured to receive and transmit data under the control of the processor 2200 to notify a UE of the allocated DL regions via configuration signaling.

In an implementation, the transceiver is configured to notify the UE of the allocated DL regions via the configuration signaling by: notifying the UE of lengths and positions of the DL regions in the time unit; or notifying the UE of one of a plurality of predefined patterns, where each pattern includes an allocation of lengths and positions of the DL regions in the time unit; or notifying the UE of start or end positions of the DL regions in the time unit.

In an implementation, the processor is further configured to notify the UE, through the transceiver, of the UL region(s) and/or the GP region(s) in the time unit via the configuration signaling by: notifying the UE of the length(s) and the position(s) of the UL region(s) in the time unit through the transceiver; or notifying the UE of one of a predefined patterns through the transceiver, where each pattern includes an allocation of the length(s) and the position(s) of the UL region(s) in the time unit; or notifying the UE of the start or end position(s) of the UL region(s) in the time unit through the transceiver; or notifying the UE of indication information through the transceiver so that the UE determines the UL region(s) in the time unit according to the indication information under a predefined rule.

In an implementation, the UL region(s) in the time unit is or are determined according to uplink scheduling signaling, or determined according to a position at which ACK/NACK for downlink transmission is fed back.

In an implementation, the configuration signaling is transmitted via higher-layer signaling or physical downlink control signaling in a unicast or broadcast or multicast form.

In an implementation, the processor is further configured to transmit a downlink control channel to the UE in at least one DL region in a time unit through the transceiver.

In an implementation, before the downlink control channel is transmitted to the UE in at least one DL region in the time unit, the processor is further configured to: determine a detection DL region of the UE in the time unit, and notify the UE of the detection DL region via configuration information through the transceiver, or determine a detection DL region in the time unit according to a pre-definition, where the detection DL region can be a part or all of the DL regions in the time unit; and when the detection DL region is configured or predefined, transmit the downlink control channel to the UE, through the transceiver, in at least one DL region in the detection DL region corresponding to the UE.

In an implementation, the processor is further configured to: when a downlink DCI format is used for the downlink control channel, receive ACK/NACK feedback for the downlink control channel, and/or ACK/NACK feedback for a downlink shared channel corresponding to the downlink control channel, through the transceiver, in a UL region corresponding to a DL region in which the downlink control channel is transmitted; or when an uplink DCI format is used for the downlink control channel, receive an uplink shared channel corresponding to the downlink control channel, through the transceiver, in a UL region corresponding to a DL region in which the downlink control channel is transmitted.

In an implementation, a UL region corresponding to a DL region is determined in one or a combination of the following schemes.

A region spaced from the DL region by a length T after an end position of the DL region is the UL region corresponding to the DL region, or the first UL region spaced from the DL region by a length T after an end position of the DL region is a UL feedback region corresponding to the DL region, where T is predefined or configured.

Or, the UL region corresponding to the DL region is indicated in indication information in the downlink control channel.

Or, a UL region corresponding to a part of DL regions in a time unit is predefined or configured as a UL region in the current time unit, and if there are a plurality of UL regions in the current time unit, then the UL region corresponding to the part of the DL regions is one or more predefined or configured UL regions in the current time unit.

Or, a UL region corresponding to a part of DL regions in a time unit is predefined or configured as a UL region in the next time unit, and if there are a plurality of UL regions in the next time unit, then the UL region corresponding to the part of the DL regions is one or more predefined or configured UL regions in the next time unit.

Or, a UL region corresponding to a DL region in a time unit is predefined or configured as a UL region in the current time unit, and if there are a plurality of DL regions and a plurality of UL regions in the current time unit, then each DL region corresponds to one or more predefined or configured UL regions.

In an implementation, a time unit is one or more slots, or one or more sub-frames.

Here in FIG. 22, the bus architecture can include any number of interconnecting buses and bridges to particularly link together various circuits including one or more processors represented by the processor 2200, and one or more memories represented by the memory 2220. The bus architecture can further link together various other circuits, e.g., a peripheral device, a manostat, a power management circuit, etc., all of which are well known in the art, so a further description thereof will be omitted in this context. The bus interface serves as an interface. The transceiver 2210 can be a number of elements, e.g., a transmitter and a receiver, which are units for communication with various other devices over a transmission medium. The processor 2200 is responsible for managing the bus architecture and performing normal processes, and the memory 2220 can store data for use by the processor 2200 in performing the operations.

Figure 23:
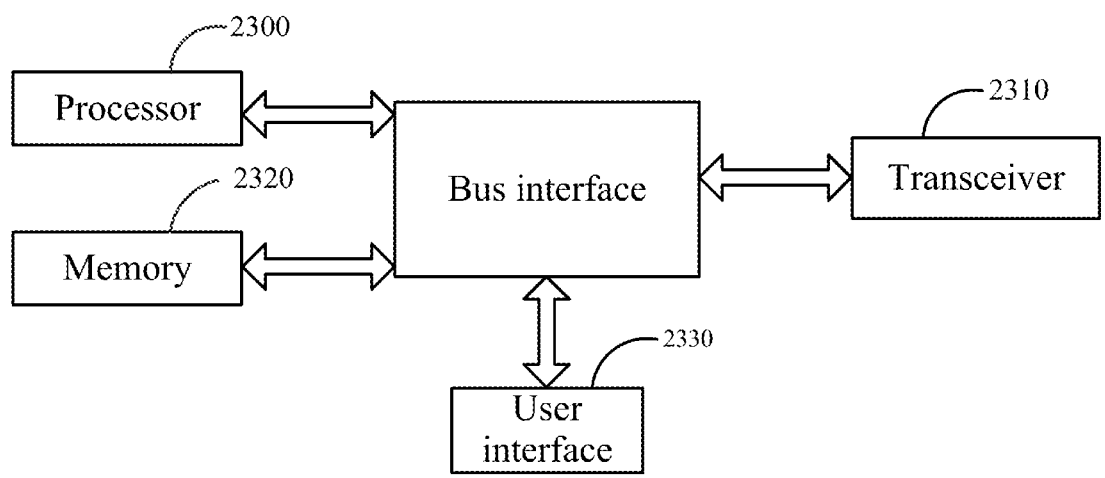
FIG. 23 is a schematic structural diagram of a UE according to an embodiment of the invention.

FIG. 23 is a schematic structural diagram of a UE according to an embodiment of the invention, and as illustrated, the UE includes: a processor 2300 configured to read and execute programs in a memory 2320 to determine DL regions allocated in a time unit according to configuration signaling, where the time unit includes at least two DL regions; and a transceiver 2310 configured to receive and transmit data under the control of the processor 2300 to receive the configuration signaling.

In an implementation, the processor is configured to determine the DL regions allocated in the time unit according to the configuration signaling by: determining lengths and positions of the DL regions in the time unit according to the configuration signaling; or determining one of a plurality of predefined patterns according to the configuration signaling, where each pattern includes an allocation of lengths and positions of the DL regions in the time unit; or determining start or end positions of the DL regions in the time unit according to the configuration signaling.

In an implementation, the processor is further configured to determine the UL region(s) and/or the GP region(s) in the time unit according to the configuration signaling, where: the length(s) and the position(s) of the UL region(s) in the time unit is notified via the configuration signaling; or one of a predefined patterns is notified via the configuration signaling, where each pattern includes an allocation of the length(s) and the position(s) of the UL region in the time unit; or the start or end position(s) of the UL region(s) in the time unit is or are notified via the configuration signaling; or indication information is notified via the configuration signaling so that the UE determines the UL region(s) in the time unit according to the indication information under a pre-defined rule.

In an implementation, the processor is further configured to: determine the UL region(s) in the time unit according to uplink scheduling signaling, or determine the UL region(s) in the time unit according to a position at which ACK/NACK for downlink transmission is fed back.

In an implementation, the processor is further configured to receive the configuration signaling transmitted via higher-layer signaling or physical downlink control signaling in a unicast or broadcast or multicast form.

In an implementation, the processor is further configured to detect each DL region or each detection DL region in a time unit for a downlink control channel.

In an implementation, before each detection DL region in the time unit is detected for a downlink control channel, the processor is further configured to: receive configuration information, and determine a detection DL region in the time unit according to the configuration information, or determine a detection DL region in the time unit according to a pre-definition, where the detection DL region can be a part or all of the DL regions in the time unit.

In an implementation, the processor is further configured: when a downlink DCI format is used for the downlink control channel, to transmit ACK/NACK feedback for the downlink control channel, and/or ACK/NACK feedback for a downlink shared channel corresponding to the downlink control channel, in a UL region corresponding to a DL region in which the downlink control channel is received; or when an uplink DCI format is used for the downlink control channel, to transmit an uplink shared channel corresponding to the downlink control channel in a UL region corresponding to a DL region in which the downlink control channel is received.

In an implementation, a UL region corresponding to a DL region is determined in one or a combination of the following schemes.

A region spaced from the DL region by a length T after an end position of the DL region is the UL region corresponding to the DL region, or the first UL region spaced from the DL region by a length T after an end position of the DL region is a UL feedback region corresponding to the DL region, where T is predefined or configured.

Or, the UL region corresponding to the DL region is indicated in indication information in the downlink control channel.

Or, a UL region corresponding to a part of DL regions in a time unit is predefined or configured as a UL region in the current time unit, and if there are a plurality of UL regions in the current time unit, then the UL region corresponding to the part of the DL regions is one or more predefined or configured UL regions in the current time unit.

Or, a UL region corresponding to a part of DL regions in a time unit is predefined or configured as a UL region in the next time unit, and if there are a plurality of UL regions in the next time unit, then the UL region corresponding to the part of the DL regions is one or more predefined or configured UL regions in the next time unit.

Or, a UL region corresponding to a DL region in a time unit is predefined or configured as a UL region in the current time unit, and if there are a plurality of DL regions and a plurality of UL regions in the current time unit, then each DL region corresponds to one or more predefined or configured UL regions.

In an implementation, a time unit is one or more slots, or one or more sub-frames.

Here in FIG. 23, the bus architecture can include any number of interconnecting buses and bridges to particularly link together various circuits including one or more processors represented by the processor 2300, and one or more memories represented by the memory 2320. The bus architecture can further link together various other circuits, e.g., a peripheral device, a manostat, a power management circuit, etc., all of which are well known in the art, so a further description thereof will be omitted in this context. The bus interface serves as an interface. The transceiver 2310 can be a number of elements, e.g., a transmitter and a receiver, which are units for communication with various other devices over a transmission medium. For different user equipments, the user interface 2330 can also be an interface via which devices are connected internally and externally as needed, and the connected devices include but will not be limited to a keypad, a monitor, a speaker, a microphone, a joystick, etc.

The processor 2300 is responsible for managing the bus architecture and performing normal processes, and the memory 2320 can store data for use by the processor 2300 in performing the operations.

In summary, in the technical solutions according to the embodiments of the invention, at least two DL detection regions are defined in a time unit, a UE detects each detection region for downlink transmission, and when downlink transmission is detected, the UE feeds back ACK/NACK in an uplink region corresponding to the downlink region. The embodiments of the invention provide a solution to transmit data, where a time unit can be divided into a plurality of downlink regions, and each downlink region can define feedback and scheduling relationships respectively, thus improving the flexibility of scheduling and the utilization ratio of system resources.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting data, applied to a base station, the method comprising:
   allocating downlink (DL) regions in a time unit, wherein the time unit comprises at least two DL regions; and
   notifying a User Equipment (UE) of the allocated DL regions via configuration signaling;
   wherein the method further comprises:
   transmitting a downlink control channel to the UE in at least one DL region in the time unit;
   wherein before the downlink control channel is transmitted to the UE in at least one DL region in the time unit, the method further comprises:
   determining a detection DL region of the UE in the time unit, and notifying the UE of the detection DL region via configuration information, or determining a detection DL region in the time unit according to a pre-definition, wherein the detection DL region is a part or all of the DL regions in the time unit; and
   transmitting the downlink control channel to the UE in at least one DL region in the detection DL region corresponding to the UE, when the detection DL region is configured or predefined.

2. The method according to claim 1, wherein notifying the UE of the allocated DL regions via the configuration signaling comprises:
   notifying the UE of lengths and positions of the DL regions in the time unit; or
   notifying the UE of one of a plurality of predefined patterns, wherein each pattern comprises an allocation of lengths and positions of the DL regions in the time unit; or
   notifying the UE of start or end positions of the DL regions in the time unit.

3. The method according to claim 1, wherein an uplink (UL) region and/or a Guard Period (GP) region in the time unit is or are further notified via the configuration signaling by:
   notifying the UE of a length and a position of the UL region in the time unit; or
   notifying the UE of one of a predefined patterns, wherein each pattern comprises an allocation of a length and a position of the UL region in the time unit; or
   notifying the UE of a start or end position of the UL region in the time unit; or
   notifying the UE of indication information so that the UE determines the UL region in the time unit according to the indication information under a predefined rule.

4. The method according to claim 1, wherein the method further comprises:
   determining an uplink (UL) region in the time unit according to uplink scheduling signaling, or according to a position at which Acknowledgement/Negative Acknowledgement (ACK/NACK) for downlink transmission is fed back.

5. The method according to claim 1, wherein the method further comprises:
   when a downlink Downlink Control Information (DCI) format is used for the downlink control channel, receiving Acknowledgement/Negative Acknowledgement (ACK/NACK) feedback for the downlink control channel, and/or ACK/NACK feedback for a downlink shared channel corresponding to the downlink control channel, in an uplink (UL) region corresponding to a DL region in which the downlink control channel is transmitted; or
   when an uplink Downlink Control Information (DCI) format is used for the downlink control channel, receiving an uplink shared channel corresponding to the downlink control channel in an uplink (UL) region corresponding to a DL region in which the downlink control channel is transmitted.

6. The method according to claim 5, wherein the UL region corresponding to the DL region is determined in one or a combination of following schemes:
   a region spaced from the DL region by a length T after an end position of the DL region is the UL region corresponding to the DL region, or a first UL region spaced from the DL region by a length T after an end position of the DL region is the UL region corresponding to the DL region, wherein T is predefined or configured; or
   the UL region corresponding to the DL region is indicated in indication information in the downlink control channel; or
   a UL region corresponding to a part of the DL regions in the time unit is predefined or configured as a UL region in the current time unit, and if there are a plurality of UL regions in the current time unit, then the UL region corresponding to the part of the DL regions is one or more predefined or configured UL regions in the current time unit; or a UL region corresponding to a part of the DL regions in the time unit is predefined or configured as a UL region in the next time unit, and if there are a plurality of UL regions in the next time unit, then the UL region corresponding to the part of the DL regions is one or more predefined or configured UL regions in the next time unit; or the UL region corresponding to the DL region in the time unit is predefined or configured as a UL region in the current time unit, and if there are a plurality of DL regions and a plurality of UL regions in the current time unit, then each DL region corresponds to one or more predefined or configured UL regions.

7. A method for transmitting data, applied to a User Equipment (UE), the method comprising:
receiving configuration signaling; and
determining downlink (DL) regions allocated in a time unit according to the configuration signaling, wherein the time unit comprises at least two DL regions;
wherein the method further comprises:
detecting each DL region or each detection DL region in the time unit for a downlink control channel;
wherein before each detection DL region in the time unit is detected for the downlink control channel, the method further comprises:
receiving configuration information, and determining a detection DL region in the time unit according to the configuration information, or determining a detection DL region in the time unit according to a pre-definition, wherein the detection DL region is a part or all of the DL regions in the time unit.

8. The method according to claim 7, wherein determining the DL regions allocated in the time unit according to the configuration signaling comprises:
determining lengths and positions of the DL regions in the time unit according to the configuration signaling; or
determining one of a plurality of predefined patterns according to the configuration signaling, wherein each pattern comprises an allocation of lengths and positions of the DL regions in the time unit; or
determining start or end positions of the DL regions in the time unit according to the configuration signaling.

9. The method according to claim 7, wherein when determining the DL regions allocated in the time unit according to the configuration signaling, the method further comprises:
determining an uplink (UL) region and/or a Guard Period (GP) region in the time unit according to the configuration signaling, wherein:
a length and a position of the UL region in the time unit is notified via the configuration signaling; or
one of a predefined patterns is notified via the configuration signaling, wherein each pattern comprises an allocation of a length and a position of the UL region in the time unit; or
a start or end position of the UL region in the time unit is notified via the configuration signaling; or
indication information is notified via the configuration signaling so that the UE determines the UL region in the time unit according to the indication information under a predefined rule.

10. The method according to claim 7, wherein the method further comprises:
determining, by the UE, an uplink (UL) region in the time unit according to uplink scheduling signaling, or according to a position at which Acknowledgement/Negative Acknowledgement (ACK/NACK) for downlink transmission is fed back.

11. The method according to claim 7, wherein the method further comprises:
when a downlink Downlink Control Information (DCI) format is used for the downlink control channel, transmitting Acknowledgement/Negative Acknowledgement (ACK/NACK) feedback for the downlink control channel, and/or ACK/NACK feedback for a downlink shared channel corresponding to the downlink control channel, in an uplink (UL) region corresponding to a DL region in which the downlink control channel is received; or
when an uplink Downlink Control Information (DCI) format is used for the downlink control channel, transmitting an uplink shared channel corresponding to the downlink control channel in an uplink (UL) region corresponding to a DL region in which the downlink control channel is received.

12. The method according to claim 11, wherein the UL region corresponding to the DL region is determined in one or a combination of following schemes:
a region spaced from the DL region by a length T after an end position of the DL region is the UL region corresponding to the DL region, or a first UL region spaced from the DL region by a length T after an end position of the DL region is the UL region corresponding to the DL region, wherein T is predefined or configured; or
the UL region corresponding to the DL region is indicated in indication information in the downlink control channel; or
a UL region corresponding to a part of the DL regions in the time unit is predefined or configured as a UL region in the current time unit, and if there are a plurality of UL regions in the current time unit, then the UL region corresponding to the part of the DL regions is one or more predefined or configured UL regions in the current time unit; or
a UL region corresponding to a part of the DL regions in the time unit is predefined or configured as a UL region in the next time unit, and if there are a plurality of UL regions in the next time unit, then the UL region corresponding to the part of the DL regions is one or more predefined or configured UL regions in the next time unit; or
the UL region corresponding to the DL region in the time unit is predefined or configured as a UL region in the current time unit, and if there are a plurality of DL regions and a plurality of UL regions in the current time unit, then each DL region corresponds to one or more predefined or configured UL regions.

13. An apparatus for transmitting data, the apparatus comprising:
a processor configured to read and execute programs in a memory to: allocate downlink (DL) regions in a time unit, and notify a UE of the allocated DL regions via configuration signaling through a transceiver, wherein the time unit comprises at least two DL regions; and
the transceiver configured to receive and transmit data under control of the processor;

wherein the processor is further configured to transmit a downlink control channel to the UE in at least one DL region in the time unit;

wherein before the downlink control channel is transmitted to the UE in at least one DL region in the time unit, the processor is further configured to:

determine a detection DL region of the UE in the time unit, and notify the UE of the detection DL region via configuration information, or determine a detection DL region in the time unit according to a pre-definition, wherein the detection DL region is a part or all of the DL regions in the time unit; and transmit the downlink control channel to the UE in at least one DL region in the detection DL region corresponding to the UE, when the detection DL region is configured or predefined.

14. The apparatus according to claim 13, wherein the processor is further configured to notify the UE of the allocated DL regions via the configuration signaling by:

notifying the UE of lengths and positions of the DL regions in the time unit; or notifying the UE of one of a plurality of predefined patterns, wherein each pattern comprises an allocation of lengths and positions of the DL regions in the time unit; or notifying the UE of start or end positions of the DL regions in the time unit;

and/or, the processor is further configured to notify the UE of an uplink (UL) region and/or a Guard Period (GP) region in the time unit via the configuration signaling by:

notifying the UE of a length and a position of the UL region in the time unit; or notifying the UE of one of a predefined patterns, wherein each pattern comprises an allocation of a length and a position of the UL region in the time unit; or notifying the UE of a start or end position of the UL region in the time unit; or notifying the UE of indication information so that the UE determines the UL region in the time unit according to the indication information under a predefined rule.

15. The apparatus according to claim 13, wherein in the apparatus:

an uplink (UL) region in the time unit is determined according to uplink scheduling signaling, or determined according to a position at which Acknowledgement/Negative Acknowledgement (ACK/NACK) for downlink transmission is fed back.

16. The apparatus according to claim 13, wherein the processor is further configured to:

receive Acknowledgement/Negative Acknowledgement (ACK/NACK) feedback for the downlink control channel, and/or ACK/NACK feedback for a downlink shared channel corresponding to the downlink control channel, in an uplink (UL) region corresponding to a DL region in which the downlink control channel is transmitted, when a downlink Downlink Control Information (DCI) format is used for the downlink control channel; or receive an uplink shared channel corresponding to the downlink control channel in an uplink (UL) region corresponding to a DL region in which the downlink control channel is transmitted, when an uplink Downlink Control Information (DCI) format is used for the downlink control channel.

17. The apparatus according to claim 16, wherein the UL region corresponding to the DL region is determined in one or a combination of following schemes:

a region spaced from the DL region by a length T after an end position of the DL region is the UL region corresponding to the DL region, or a first UL region spaced from the DL region by a length T after an end position of the DL region is the UL region corresponding to the DL region, wherein T is predefined or configured; or the UL region corresponding to the DL region is indicated in indication information in the downlink control channel; or a UL region corresponding to a part of the DL regions in the time unit is predefined or configured as a UL region in the current time unit, and if there are a plurality of UL regions in the current time unit, then the UL region corresponding to the part of the DL regions is one or more predefined or configured UL regions in the current time unit; or a UL region corresponding to a part of the DL regions in the time unit is predefined or configured as a UL region in the next time unit, and if there are a plurality of UL regions in the next time unit, then the UL region corresponding to the part of the DL regions is one or more predefined or configured UL regions in the next time unit; or the UL region corresponding to the DL region in the time unit is predefined or configured as a UL region in the current time unit, and if there are a plurality of DL regions and a plurality of UL regions in the current time unit, then each DL region corresponds to one or more predefined or configured UL regions.

18. An apparatus for transmitting data, the apparatus comprising:

a processor configured to read and execute programs in a memory to: receive configuration signaling through a transceiver, and determine downlink (DL) regions allocated in a time unit according to the configuration signaling, wherein the time unit comprises at least two DL regions; and the transceiver configured to receive and transmit data under control of the processor;

wherein the processor is further configured to detect each DL region or each detection DL region in the time unit for a downlink control channel;

wherein before each detection DL region in the time unit is detected for the downlink control channel, the processor is further configured to:

receive configuration information, and determine a detection DL region in the time unit according to the configuration information, or determine a detection DL region in the time unit according to a pre-definition, wherein the detection DL region is a part or all of the DL regions in the time unit.

19. The apparatus according to claim 18, wherein the processor is configured to determine the DL regions allocated in the time unit according to the configuration signaling by:

determining lengths and positions of the DL regions in the time unit according to the configuration signaling; or determining one of a plurality of predefined patterns according to the configuration signaling, wherein each pattern comprises an allocation of lengths and positions of the DL regions in the time unit; or determining start or end positions of the DL regions in the time unit according to the configuration signaling;

and/or, the processor is further configured to:

determine an uplink (UL) region and/or a Guard Period (GP) region in the time unit according to the configuration signaling, wherein:

a length and a position of the UL region in the time unit is notified via the configuration signaling; or one of a predefined patterns is notified via the configuration signaling, wherein each pattern comprises an allocation of a length and a position of the UL region in the time unit; or a start or end position of the UL region in the time unit is notified via the configuration signaling; or indication information is notified via the configuration signaling so that the UE determines the UL region in the time unit according to the indication information under a predefined rule.

20. The apparatus according to claim 18, wherein the processor is further configured to:

determine an uplink (UL) region in the time unit according to uplink scheduling signaling, or according to a position at which Acknowledgement/Negative Acknowledgement (ACK/NACK) for downlink transmission is fed back.

21. The apparatus according to claim 18, wherein the processor is further configured to:

transmit Acknowledgement/Negative Acknowledgement (ACK/NACK) feedback for the downlink control channel, and/or ACK/NACK feedback for a downlink shared channel corresponding to the downlink control channel, in an uplink (UL) region corresponding to a DL region in which the downlink control channel is received, when a downlink Downlink Control Information (DCI) format is used for the downlink control channel; or transmit an uplink shared channel corresponding to the downlink control channel in an uplink (UL) region corresponding to a DL region in which the downlink control channel is received, when an uplink Downlink Control Information (DCI) format is used for the downlink control channel.

22. The apparatus according to claim 21, wherein the UL region corresponding to the DL region is determined in one or a combination of following schemes:

a region spaced from the DL region by a length T after an end position of the DL region is the UL region corresponding to the DL region, or a first UL region spaced from the DL region by a length T after an end position of the DL region is the UL region corresponding to the DL region, wherein T is predefined or configured; or the UL region corresponding to the DL region is indicated in indication information in the downlink control channel; or a UL region corresponding to a part of the DL regions in the time unit is predefined or configured as a UL region in the current time unit, and if there are a plurality of UL regions in the current time unit, then the UL region corresponding to the part of the DL regions is one or more predefined or configured UL regions in the current time unit; or a UL region corresponding to a part of the DL regions in the time unit is predefined or configured as a UL region in the next time unit, and if there are a plurality of UL regions in the next time unit, then the UL region corresponding to the part of the DL regions is one or more predefined or configured UL regions in the next time unit; or the UL region corresponding to the DL region in the time unit is predefined or configured as a UL region in the current time unit, and if there are a plurality of DL regions and a plurality of UL regions in the current time unit, then each DL region corresponds to one or more predefined or configured UL regions.

* * * * *